United States Patent [19]
Cok

[11] Patent Number: 5,933,543
[45] Date of Patent: *Aug. 3, 1999

[54] METHOD AND APPARATUS FOR OBSCURING FEATURES OF AN IMAGE

[75] Inventor: Ronald S. Cok, Rochester, N.Y.

[73] Assignee: Eastman Kodak Company, Rochester, N.Y.

[*] Notice: This patent is subject to a terminal disclaimer.

[21] Appl. No.: 08/928,150

[22] Filed: Sep. 12, 1997

Related U.S. Application Data

[63] Continuation of application No. 08/230,195, Apr. 20, 1994, Pat. No. 5,710,839.

[51] Int. Cl.[6] .................................................. G06K 9/40
[52] U.S. Cl. ........................ 382/264; 348/206; 348/248
[58] Field of Search ................................... 382/264, 282, 382/283, 318; 348/206, 239, 248, 597, 619

[56] References Cited

U.S. PATENT DOCUMENTS

| | | | |
|---|---|---|---|
| 4,641,356 | 2/1987 | Sternberg ................................. | 382/49 |
| 4,731,864 | 3/1988 | Modla ..................................... | 382/264 |
| 4,746,916 | 5/1988 | Sanbe ..................................... | 348/206 |
| 4,833,723 | 5/1989 | Loveridge et al. ..................... | 382/264 |
| 5,222,159 | 6/1993 | Kawamura et al. .................... | 382/264 |
| 5,272,764 | 12/1993 | Bloomberg et al. ..................... | 382/48 |
| 5,561,724 | 10/1996 | Kido et al. .............................. | 382/264 |
| 5,563,962 | 10/1996 | Peters et al. ........................... | 382/274 |
| 5,649,031 | 7/1997 | Nakamura et al. ..................... | 382/264 |

OTHER PUBLICATIONS

"Digital Image Processing" Gonzalez et al, Nov. 1992, pp. 191–193.

Primary Examiner—Christopher S. Kelley
Attorney, Agent, or Firm—Peyton C. Watkins

[57] ABSTRACT

A method and system that obscures image features in a region of interest designated by a user. An operator designates a special shaped region of interest and a computer convolves a specially designed kernel with the image data in the region. The kernel is designed to pull features outside the region into the region while combining the information within the region with the information pulled from outside. The kernel can be designed to correspond to the shape of the region for efficient computation. Once the region of interest is obscured the image is printed resulting in a print that does not include undesirable features.

20 Claims, 24 Drawing Sheets

FIG.4

|   |   |   |   |   |
|---|---|---|---|---|
| 0 | 0 | 1 | 0 | 0 |
| 1 | 4 | 4 | 4 | 1 |
| 0 | 0 | 1 | 0 | 0 |
| 0 | 0 | 0 | 0 | 0 |
| 0 | 0 | 0 | 0 | 0 |

FIG. 5A
TOP KERNEL

|   |   |   |   |   |
|---|---|---|---|---|
| 0 | 1 | 0 | 0 | 0 |
| 0 | 4 | 0 | 0 | 0 |
| 1 | 4 | 1 | 0 | 0 |
| 0 | 4 | 0 | 0 | 0 |
| 0 | 1 | 0 | 0 | 0 |

FIG. 5B
LEFT KERNEL

|   |   |   |   |   |
|---|---|---|---|---|
| 0 | 0 | 0 | 1 | 0 |
| 0 | 0 | 0 | 4 | 0 |
| 0 | 0 | 1 | 4 | 1 |
| 0 | 0 | 0 | 4 | 0 |
| 0 | 0 | 0 | 1 | 0 |

FIG. 5C
RIGHT KERNEL

|   |   |   |   |   |
|---|---|---|---|---|
| 0 | 0 | 0 | 0 | 0 |
| 0 | 0 | 0 | 0 | 0 |
| 0 | 0 | 1 | 0 | 0 |
| 1 | 4 | 4 | 4 | 1 |
| 0 | 0 | 1 | 0 | 0 |

FIG. 5D
BOTTOM KERNEL

| 5 | 6 | 7 | 2 | 5 | 0 | 1 | 5 | 4 | 6 | 2 | 2 | 5 | 0 | 1 | 5 | 4 | 5 | 2 | 2 | 5 | 4 | 3 | 4 |
|---|---|---|---|---|---|---|---|---|---|---|---|---|---|---|---|---|---|---|---|---|---|---|---|
| 7 | 5 | 1 | 2 | 3 | 4 | 0 | 6 | 7 | 5 | 6 | 2 | 3 | 4 | 3 | 2 | 7 | 6 | 6 | 2 | 3 | 5 | 3 | 4 |
| 5 | 8 | 4 | 5 | 1 | 5 | 6 | 4 | 5 | 8 | 4 | 5 | 1 | 5 | 3 | 4 | 2 | 3 | 4 | 5 | 1 | 4 | 3 | 4 |
| 3 | 5 | 4 | 5 | 4 | 5 | 1 | 2 | 3 | 5 | 5 | 2 | 7 | 5 | 4 | 2 | 4 | 6 | 5 | 5 | 3 | 5 | 4 | 3 |
| 3 | 4 | 5 | 4 | 2 | 4 | 5 | 0 | 3 | 1 | 5 | 4 | 152 | 154 | 5 | 3 | 3 | 1 | 5 | 4 | 2 | 4 | 5 | 3 |
| 4 | 2 | 3 | 5 | 5 | 5 | 3 | 4 | 4 | 152 | 146 | 145 | 144 | 145 | 146 | 154 | 4 | 2 | 6 | 5 | 6 | 3 | 6 | 4 |
| 5 | 5 | 1 | 4 | 6 | 4 | 5 | 146 | 145 | 135 | 143 | 144 | 146 | 144 | 153 | 146 | 145 | 5 | 3 | 2 | 6 | 4 | 3 | 6 |
| 5 | 4 | 2 | 5 | 1 | 5 | 3 | 144 | 145 | 154 | 142 | 5 | 3 | 145 | 153 | 155 | 145 | 144 | 3 | 5 | 3 | 6 | 5 | 5 |
| 5 | 6 | 7 | 2 | 5 | 0 | 151 | 145 | 144 | 6 | 2 | 2 | 5 | 0 | 151 | 145 | 144 | 145 | 152 | 2 | 5 | 4 | 3 | 4 |
| 7 | 5 | 1 | 2 | 3 | 4 | 135 | 136 | 137 | 5 | 6 | 2 | 3 | 4 | 3 | 142 | 147 | 146 | 146 | 2 | 3 | 5 | 3 | 4 |
| 5 | 8 | 4 | 5 | 1 | 5 | 146 | 154 | 145 | 8 | 4 | 5 | 1 | 5 | 3 | 4 | 142 | 143 | 144 | 5 | 1 | 4 | 3 | 4 |
| 3 | 4 | 3 | 5 | 6 | 5 | 151 | 152 | 143 | 6 | 5 | 3 | 7 | 5 | 4 | 2 | 144 | 146 | 145 | 5 | 3 | 5 | 4 | 3 |
| 3 | 4 | 5 | 4 | 2 | 4 | 145 | 144 | 143 | 151 | 5 | 4 | 2 | 4 | 5 | 3 | 143 | 151 | 147 | 4 | 5 | 4 | 5 | 3 |
| 4 | 2 | 3 | 5 | 5 | 5 | 3 | 144 | 144 | 142 | 4 | 5 | 4 | 5 | 6 | 4 | 144 | 152 | 146 | 5 | 6 | 3 | 6 | 4 |
| 5 | 5 | 1 | 4 | 2 | 4 | 5 | 3 | 145 | 145 | 6 | 4 | 3 | 4 | 3 | 4 | 145 | 145 | 143 | 2 | 6 | 4 | 3 | 6 |
| 5 | 4 | 2 | 5 | 1 | 5 | 3 | 4 | 135 | 144 | 142 | 5 | 3 | 5 | 3 | 143 | 145 | 144 | 3 | 5 | 3 | 6 | 4 | 5 |
| 5 | 6 | 7 | 2 | 5 | 0 | 1 | 5 | 4 | 146 | 72 | 142 | 65 | 70 | 151 | 145 | 144 | 5 | 2 | 2 | 5 | 4 | 3 | 4 |
| 7 | 5 | 1 | 2 | 3 | 4 | 3 | 6 | 7 | 85 | 86 | 82 | 83 | 74 | 63 | 2 | 7 | 6 | 6 | 2 | 3 | 5 | 3 | 4 |
| 5 | 8 | 4 | 5 | 1 | 5 | 6 | 4 | 55 | 68 | 45 | 5 | 61 | 65 | 63 | 64 | 2 | 3 | 4 | 5 | 1 | 4 | 3 | 4 |
| 3 | 4 | 3 | 5 | 6 | 5 | 1 | 72 | 73 | 66 | 5 | 3 | 7 | 65 | 64 | 72 | 4 | 6 | 5 | 5 | 3 | 5 | 4 | 3 |
| 3 | 4 | 5 | 4 | 2 | 4 | 50 | 45 | 67 | 71 | 5 | 4 | 2 | 64 | 75 | 63 | 53 | 1 | 7 | 4 | 5 | 4 | 5 | 3 |
| 4 | 2 | 3 | 5 | 5 | 5 | 73 | 54 | 44 | 62 | 4 | 5 | 4 | 65 | 76 | 47 | 64 | 2 | 6 | 5 | 6 | 3 | 6 | 4 |
| 5 | 5 | 1 | 4 | 2 | 4 | 55 | 53 | 55 | 5 | 6 | 4 | 3 | 4 | 73 | 84 | 65 | 5 | 3 | 2 | 6 | 4 | 3 | 6 |
| 5 | 4 | 2 | 5 | 1 | 5 | 43 | 54 | 55 | 4 | 2 | 5 | 3 | 5 | 73 | 83 | 55 | 4 | 3 | 5 | 3 | 6 | 4 | 5 |

FIG. 6

| 5 | 6 | 7 | 2 | 5 | 0 | 1 | 5 |
|---|---|---|---|---|---|---|---|
| 7 | 5 | 1 | 2 | 3 | 4 | 0 | 6 |
| 5 | 8 | 4 | 5 | 1 | 5 | 6 | 4 |
| 3 | 5 | 4 | | | | | |
| 3 | 4 | 5 | | | | | |
| 4 | 2 | 3 | | | | | |
| 5 | 5 | 1 | | | | | |
| 5 | 4 | 2 | | | | | |

FIG.7A

| 5 | 6 | 7 | 2 | 5 | 0 | 1 | 5 |
|---|---|---|---|---|---|---|---|
| 7 | 5 | 1 | 2 | 3 | 4 | 0 | 6 |
| 5 | 8 | | 2 | 2 | 2 | 3 | 4 |
| 3 | 5 | 5 | | | | | |
| 3 | 4 | 4 | | | | | |
| 4 | 2 | 3 | | | | | |
| 5 | 5 | 3 | | | | | |
| 5 | 4 | 4 | | | | | |

FIG.7B

| 5 | 6 | 7 | 2 | 5 | 0 | 1 | 5 | 4 | 6 | 2 | 2 | 5 | 0 | 1 | 5 | 4 | 5 | 2 | 2 | 5 | 4 | 3 | 4 |
|---|---|---|---|---|---|---|---|---|---|---|---|---|---|---|---|---|---|---|---|---|---|---|---|
| 7 | 5 | 1 | 2 | 3 | 4 | 0 | 6 | 7 | 5 | 6 | 2 | 3 | 4 | 3 | 2 | 7 | 6 | 6 | 2 | 3 | 5 | 3 | 4 |
| 5 | 8 | 4 | 2 | 3 | 3 | 3 | 4 | 5 | 5 | 4 | 3 | 3 | 3 | 3 | 4 | 4 | 5 | 4 | 3 | 3 | 3 | 3 | 4 |
| 3 | 5 | 5 | 5 | 4 | 5 | 1 | 2 | 3 | 5 | 5 | 2 | 7 | 5 | 4 | 2 | 4 | 6 | 5 | 5 | 3 | 4 | 4 | 3 |
| 3 | 4 | 4 | 4 | 2 | 4 | 5 | 0 | 3 | 1 | 5 | 4 | 152 | 154 | 5 | 3 | 3 | 1 | 5 | 4 | 2 | 4 | 5 | 3 |
| 4 | 2 | 3 | 5 | 5 | 5 | 3 | 4 | 4 | 152 | 146 | 145 | 144 | 145 | 146 | 154 | 4 | 2 | 6 | 5 | 6 | 4 | 6 | 4 |
| 5 | 5 | 3 | 4 | 6 | 4 | 5 | 146 | 145 | 135 | 143 | 144 | 146 | 144 | 153 | 146 | 145 | 5 | 3 | 2 | 6 | 4 | 3 | 6 |
| 5 | 4 | 4 | 5 | 1 | 5 | 3 | 144 | 145 | 154 | 142 | 5 | 3 | 145 | 153 | 155 | 145 | 144 | 3 | 5 | 3 | 4 | 5 | 5 |
| 5 | 6 | 5 | 2 | 5 | 0 | 151 | 145 | 144 | 6 | 2 | 2 | 5 | 0 | 151 | 145 | 144 | 145 | 152 | 2 | 5 | 3 | 3 | 4 |
| 7 | 5 | 5 | 2 | 3 | 4 | 135 | 136 | 137 | 5 | 6 | 2 | 3 | 4 | 3 | 142 | 147 | 146 | 146 | 2 | 3 | 5 | 3 | 4 |
| 5 | 8 | 5 | 5 | 1 | 5 | 146 | 154 | 145 | 8 | 4 | 5 | 1 | 5 | 3 | 4 | 142 | 143 | 144 | 5 | 1 | 3 | 3 | 4 |
| 3 | 4 | 4 | 5 | 6 | 5 | 151 | 152 | 143 | 6 | 5 | 3 | 7 | 5 | 4 | 2 | 144 | 146 | 145 | 5 | 3 | 4 | 4 | 3 |
| 3 | 4 | 3 | 4 | 2 | 4 | 145 | 144 | 143 | 151 | 5 | 4 | 2 | 4 | 5 | 3 | 143 | 151 | 147 | 4 | 5 | 4 | 5 | 3 |
| 4 | 2 | 3 | 5 | 5 | 5 | 3 | 144 | 144 | 142 | 4 | 5 | 4 | 5 | 6 | 4 | 144 | 152 | 146 | 5 | 6 | 4 | 6 | 4 |
| 5 | 5 | 3 | 4 | 2 | 4 | 5 | 3 | 145 | 145 | 6 | 4 | 3 | 4 | 3 | 4 | 145 | 145 | 143 | 2 | 6 | 4 | 3 | 6 |
| 5 | 4 | 4 | 5 | 1 | 5 | 3 | 4 | 135 | 144 | 142 | 5 | 3 | 5 | 3 | 143 | 145 | 144 | 3 | 5 | 3 | 3 | 4 | 5 |
| 5 | 6 | 5 | 2 | 5 | 0 | 1 | 5 | 4 | 146 | 72 | 142 | 65 | 70 | 151 | 145 | 144 | 5 | 2 | 2 | 5 | 3 | 3 | 4 |
| 7 | 5 | 5 | 2 | 3 | 4 | 3 | 6 | 7 | 85 | 86 | 82 | 83 | 74 | 63 | 2 | 7 | 6 | 6 | 2 | 3 | 3 | 3 | 4 |
| 5 | 8 | 5 | 5 | 1 | 5 | 6 | 4 | 55 | 68 | 45 | 5 | 61 | 65 | 63 | 64 | 2 | 3 | 4 | 5 | 1 | 3 | 3 | 4 |
| 3 | 4 | 4 | 5 | 6 | 5 | 1 | 72 | 73 | 66 | 5 | 3 | 7 | 65 | 64 | 72 | 4 | 6 | 5 | 5 | 3 | 4 | 4 | 3 |
| 3 | 4 | 3 | 4 | 2 | 4 | 50 | 45 | 67 | 71 | 5 | 4 | 2 | 64 | 75 | 63 | 53 | 1 | 7 | 4 | 5 | 4 | 5 | 3 |
| 4 | 2 | 3 | 2 | 6 | 19 | 38 | 48 | 38 | 24 | 7 | 4 | 8 | 29 | 53 | 64 | 50 | 24 | 7 | 3 | 3 | 4 | 6 | 4 |
| 5 | 5 | 1 | 4 | 2 | 4 | 55 | 53 | 55 | 5 | 6 | 4 | 3 | 4 | 73 | 84 | 65 | 5 | 3 | 2 | 6 | 4 | 3 | 6 |
| 5 | 4 | 2 | 5 | 1 | 5 | 43 | 54 | 55 | 4 | 2 | 5 | 3 | 5 | 73 | 83 | 55 | 4 | 3 | 5 | 3 | 6 | 4 | 5 |

FIG.8

| 5 | 6 | 7 | 2 | 5 | 0 | 1 | 5 | 4 | 6 | 2 | 2 | 5 | 0 | 1 | 5 | 4 | 5 | 2 | 2 | 5 | 4 | 3 | 4 |
|---|---|---|---|---|---|---|---|---|---|---|---|---|---|---|---|---|---|---|---|---|---|---|---|
| 7 | 5 | 1 | 2 | 3 | 4 | 0 | 6 | 7 | 5 | 6 | 2 | 3 | 4 | 3 | 2 | 7 | 6 | 6 | 2 | 3 | 5 | 3 | 4 |
| 5 | 8 | 4 | 2 | 3 | 3 | 3 | 4 | 5 | 5 | 4 | 3 | 3 | 3 | 3 | 4 | 4 | 5 | 4 | 3 | 3 | 3 | 3 | 4 |
| 3 | 5 | 5 | 5 | 4 | 5 | 1 | 2 | 3 | 5 | 5 | 2 | 7 | 5 | 4 | 2 | 4 | 6 | 5 | 5 | 3 | 4 | 4 | 3 |
| 3 | 4 | 4 | 4 | 2 | 4 | 5 | 0 | 3 | 1 | 5 | 4 | 152 | 154 | 5 | 3 | 3 | 1 | 5 | 4 | 2 | 4 | 5 | 3 |
| 4 | 2 | 3 | 5 | 5 | 5 | 3 | 4 | 4 | 152 | 146 | 145 | 144 | 145 | 146 | 154 | 4 | 2 | 6 | 5 | 6 | 4 | 6 | 4 |
| 5 | 5 | 3 | 4 | 6 | 4 | 5 | 146 | 145 | 135 | 143 | 144 | 146 | 144 | 153 | 146 | 145 | 5 | 3 | 2 | 6 | 4 | 3 | 6 |
| 5 | 4 | 4 | 5 | 1 | 5 | 3 | 144 | 145 | 154 | 142 | 5 | 3 | 145 | 153 | 155 | 145 | 144 | 3 | 5 | 3 | 4 | 5 | 5 |
| 5 | 6 | 5 | 2 | 5 | 0 | 151 | 145 | 144 | 6 | 2 | 2 | 5 | 0 | 151 | 145 | 144 | 145 | 152 | 2 | 5 | 3 | 3 | 4 |
| 7 | 5 | 5 | 2 | 3 | 4 | 135 | 136 | 137 | 5 | 6 | 2 | 3 | 4 | 3 | 142 | 147 | 146 | 146 | 2 | 3 | 5 | 3 | 4 |
| 5 | 8 | 5 | 5 | 1 | 5 | 146 | 154 | 145 | 8 | 4 | 5 | 1 | 5 | 3 | 4 | 142 | 143 | 144 | 5 | 1 | 3 | 3 | 4 |
| 3 | 4 | 4 | 5 | 6 | 5 | 151 | 152 | 143 | 6 | 5 | 3 | 7 | 5 | 4 | 2 | 144 | 146 | 145 | 5 | 3 | 4 | 4 | 3 |
| 3 | 4 | 3 | 4 | 2 | 4 | 145 | 144 | 143 | 151 | 5 | 4 | 2 | 4 | 5 | 3 | 143 | 151 | 147 | 4 | 5 | 4 | 5 | 3 |
| 4 | 2 | 3 | 5 | 5 | 5 | 3 | 144 | 144 | 142 | 4 | 5 | 4 | 5 | 6 | 4 | 144 | 152 | 146 | 5 | 6 | 4 | 6 | 4 |
| 5 | 5 | 3 | 4 | 2 | 4 | 5 | 3 | 145 | 145 | 6 | 4 | 3 | 4 | 3 | 4 | 145 | 145 | 143 | 2 | 6 | 4 | 3 | 6 |
| 5 | 4 | 4 | 5 | 1 | 5 | 3 | 4 | 135 | 144 | 142 | 5 | 3 | 5 | 3 | 143 | 145 | 144 | 3 | 5 | 3 | 3 | 4 | 5 |
| 5 | 6 | 5 | 2 | 5 | 0 | 1 | 5 | 4 | 146 | 72 | 142 | 65 | 70 | 151 | 145 | 144 | 5 | 2 | 2 | 5 | 3 | 3 | 4 |
| 7 | 5 | 5 | 2 | 3 | 4 | 3 | 6 | 7 | 85 | 86 | 82 | 83 | 74 | 63 | 2 | 7 | 6 | 6 | 2 | 3 | 3 | 3 | 4 |
| 5 | 8 | 5 | 5 | 1 | 5 | 6 | 4 | 55 | 68 | 45 | 5 | 61 | 65 | 63 | 64 | 2 | 3 | 4 | 5 | 1 | 3 | 3 | 4 |
| 3 | 4 | 4 | 5 | 6 | 5 | 1 | 72 | 73 | 66 | 5 | 3 | 7 | 65 | 64 | 72 | 4 | 6 | 5 | 5 | 3 | 4 | 4 | 3 |
| 3 | 4 | 3 | 4 | 2 | 4 | 50 | 45 | 67 | 71 | 5 | 4 | 2 | 64 | 75 | 63 | 53 | 1 | 7 | 4 | 5 | 4 | 5 | 3 |
| 4 | 2 | 3 | 2 | 6 | 19 | 38 | 48 | 38 | 24 | 7 | 4 | 8 | 29 | 53 | 64 | 50 | 24 | 7 | 3 | 3 | 4 | 6 | 4 |
| 5 | 5 | 1 | 4 | 2 | 4 | 55 | 53 | 55 | 5 | 6 | 4 | 3 | 4 | 73 | 84 | 65 | 5 | 3 | 2 | 6 | 4 | 3 | 6 |
| 5 | 4 | 2 | 5 | 1 | 5 | 43 | 54 | 55 | 4 | 2 | 5 | 3 | 5 | 73 | 83 | 55 | 4 | 3 | 5 | 3 | 6 | 4 | 5 |

FIG. 9

| 5 | 6 | 7 | 2 | 5 | 0 | 1 | 5 | 4 | 6 | 2 | 2 | 5 | 0 | 1 | 5 | 4 | 5 | 2 | 2 | 5 | 4 | 3 | 4 |
|---|---|---|---|---|---|---|---|---|---|---|---|---|---|---|---|---|---|---|---|---|---|---|---|
| 7 | 5 | 1 | 2 | 3 | 4 | 0 | 6 | 7 | 5 | 6 | 2 | 3 | 4 | 3 | 2 | 7 | 6 | 6 | 2 | 3 | 5 | 3 | 4 |
| 5 | 8 | 4 | 2 | 3 | 3 | 3 | 4 | 5 | 5 | 4 | 3 | 3 | 3 | 3 | 4 | 4 | 5 | 4 | 3 | 3 | 3 | 3 | 4 |
| 3 | 5 | 5 | 3 | 2 | 2 | 2 | 3 | 4 | 4 | 4 | 3 | 3 | 3 | 3 | 3 | 4 | 4 | 4 | 3 | 3 | 4 | 4 | 3 |
| 3 | 4 | 4 | 3 | 2 | 2 | 2 | 2 | 3 | 3 | 3 | 3 | 12 | 12 | 3 | 3 | 3 | 3 | 3 | 3 | 3 | 4 | 5 | 3 |
| 4 | 2 | 3 | 3 | 3 | 2 | 2 | 2 | 2 | 12 | 12 | 14 | 16 | 16 | 14 | 13 | 3 | 3 | 3 | 3 | 4 | 4 | 6 | 4 |
| 5 | 5 | 3 | 3 | 3 | 3 | 2 | 11 | 14 | 16 | 19 | 21 | 23 | 22 | 21 | 18 | 15 | 3 | 3 | 3 | 4 | 4 | 3 | 6 |
| 5 | 4 | 4 | 4 | 3 | 3 | 2 | 15 | 20 | 24 | 25 | 19 | 20 | 29 | 28 | 25 | 18 | 14 | 2 | 3 | 3 | 4 | 5 | 5 |
| 5 | 6 | 5 | 4 | 4 | 3 | 12 | 16 | 24 | 20 | 20 | 20 | 22 | 23 | 33 | 29 | 23 | 16 | 12 | 3 | 3 | 3 | 3 | 4 |
| 7 | 5 | 5 | 4 | 4 | 3 | 11 | 18 | 24 | 21 | 19 | 19 | 21 | 24 | 25 | 30 | 24 | 18 | 11 | 2 | 3 | 5 | 3 | 4 |
| 5 | 8 | 5 | 4 | 3 | 3 | 11 | 19 | 25 | 23 | 20 | 19 | 20 | 22 | 24 | 23 | 25 | 18 | 11 | 3 | 3 | 3 | 3 | 4 |
| 3 | 4 | 4 | 4 | 3 | 3 | 12 | 19 | 25 | 22 | 23 | 19 | 19 | 21 | 22 | 23 | 26 | 19 | 11 | 3 | 3 | 4 | 4 | 3 |
| 3 | 4 | 3 | 3 | 3 | 3 | 11 | 16 | 23 | 29 | 24 | 24 | 23 | 21 | 21 | 23 | 26 | 19 | 12 | 3 | 4 | 4 | 5 | 3 |
| 4 | 2 | 3 | 3 | 3 | 3 | 3 | 14 | 18 | 26 | 27 | 28 | 28 | 25 | 22 | 22 | 25 | 19 | 12 | 3 | 4 | 4 | 6 | 4 |
| 5 | 5 | 3 | 3 | 3 | 3 | 3 | 3 | 16 | 31 | 30 | 30 | 30 | 31 | 28 | 21 | 23 | 16 | 11 | 3 | 3 | 4 | 3 | 6 |
| 5 | 4 | 4 | 4 | 3 | 3 | 3 | 3 | 22 | 35 | 37 | 29 | 31 | 34 | 35 | 35 | 19 | 13 | 2 | 3 | 3 | 3 | 4 | 5 |
| 5 | 6 | 5 | 4 | 4 | 3 | 3 | 13 | 25 | 34 | 29 | 33 | 31 | 35 | 42 | 41 | 25 | 3 | 2 | 2 | 3 | 3 | 3 | 4 |
| 7 | 5 | 5 | 4 | 4 | 3 | 12 | 27 | 28 | 30 | 25 | 24 | 28 | 34 | 39 | 36 | 31 | 12 | 2 | 2 | 3 | 3 | 3 | 4 |
| 5 | 8 | 5 | 4 | 3 | 10 | 26 | 30 | 33 | 28 | 20 | 15 | 24 | 33 | 41 | 43 | 34 | 24 | 8 | 3 | 3 | 3 | 3 | 4 |
| 3 | 4 | 4 | 4 | 6 | 19 | 28 | 38 | 35 | 27 | 15 | 12 | 18 | 33 | 44 | 48 | 37 | 25 | 14 | 5 | 3 | 4 | 4 | 3 |
| 3 | 4 | 3 | 3 | 9 | 19 | 35 | 39 | 37 | 25 | 12 | 8 | 14 | 31 | 49 | 54 | 45 | 24 | 12 | 5 | 4 | 4 | 5 | 3 |
| 4 | 2 | 3 | 2 | 6 | 19 | 38 | 48 | 38 | 24 | 7 | 4 | 8 | 29 | 53 | 64 | 50 | 24 | 7 | 3 | 3 | 4 | 6 | 4 |
| 5 | 5 | 1 | 4 | 2 | 4 | 55 | 53 | 55 | 5 | 6 | 4 | 3 | 4 | 73 | 84 | 65 | 5 | 3 | 2 | 6 | 4 | 3 | 6 |
| 5 | 4 | 2 | 5 | 1 | 5 | 43 | 54 | 55 | 4 | 2 | 5 | 3 | 5 | 73 | 83 | 55 | 4 | 3 | 5 | 3 | 6 | 4 | 5 |

| 24 | 20 | 20 | 20 | 22 | 23 | 33 |
|----|----|----|----|----|----|----|
| 24 | 21 | 19 | 19 | 21 | 24 | 25 |
| 25 | 23 | 20 | 19 | 20 | 22 | 24 |
| 25 | 22 | 23 | 19 | 19 | 21 | 22 |
| 23 | 29 | 24 | 24 | 23 | 21 | 21 |
| 18 | 26 | 27 | 28 | 28 | 25 | 22 |
| 16 | 31 | 30 | 30 | 30 | 31 | 28 |

FIG.12

| 24 | 21 | 19 | 19 | 21 | 24 | 25 | 30 |
|----|----|----|----|----|----|----|----|
| 25 | 23 | 20 | 19 | 20 | 22 | 24 | 23 |
| 25 | 22 | 23 | 19 | 19 | 21 | 22 | 23 |
| 23 | 29 | 24 | 24 | 23 | 21 | 21 | 23 |
| 18 | 26 | 27 | 28 | 28 | 25 | 22 | 22 |
| 16 | 31 | 30 | 30 | 30 | 31 | 28 | 21 |

FIG.13

| 3 | 12 | 16 | 24 | 21 | 19 | 19 | 21 | 24 | 25 | 30 | 23 |
|---|----|----|----|----|----|----|----|----|----|----|----|
| 3 | 11 | 18 | 25 | 23 | 20 | 19 | 20 | 22 | 24 | 23 | 24 |
| 3 | 11 | 19 | 25 | 22 | 23 | 19 | 19 | 21 | 22 | 23 | 25 |
| 3 | 12 | 19 | 23 | 29 | 24 | 24 | 23 | 21 | 21 | 23 | 26 |
| 3 | 11 | 16 | 18 | 26 | 27 | 28 | 28 | 25 | 22 | 22 | 26 |
| 3 | 3 | 14 | 16 | 31 | 30 | 30 | 30 | 31 | 28 | 21 | 25 |
| 3 | 3 | 3 | 22 | 35 | 37 | 29 | 31 | 35 | 35 | 35 | 23 |

|   |   |   |   |   |
|---|---|---|---|---|
| 0 | 0 | 1 | 0 | 0 |
| 0 | 1 | 4 | 1 | 0 |
| 0 | 0 | 1 | 0 | 0 |
| 0 | 0 | 0 | 0 | 0 |
| 0 | 0 | 0 | 0 | 0 |

FIG. 14A
TOP KERNEL

|   |   |   |   |   |
|---|---|---|---|---|
| 0 | 0 | 0 | 0 | 0 |
| 0 | 1 | 0 | 0 | 0 |
| 1 | 4 | 1 | 0 | 0 |
| 0 | 1 | 0 | 0 | 0 |
| 0 | 0 | 0 | 0 | 0 |

FIG. 14B
LEFT KERNEL

|   |   |   |   |   |
|---|---|---|---|---|
| 0 | 0 | 0 | 0 | 0 |
| 0 | 0 | 0 | 1 | 0 |
| 0 | 0 | 1 | 4 | 1 |
| 0 | 0 | 0 | 1 | 0 |
| 0 | 0 | 0 | 0 | 0 |

FIG. 14C
RIGHT KERNEL

|   |   |   |   |   |
|---|---|---|---|---|
| 0 | 0 | 0 | 0 | 0 |
| 0 | 0 | 0 | 0 | 0 |
| 0 | 0 | 1 | 0 | 0 |
| 1 | 4 | 4 | 4 | 1 |
| 0 | 0 | 1 | 0 | 0 |

FIG. 14D
BOTTOM KERNEL

| 5 | 6 | 7 | 2 | 5 | 0 | 1 | 5 | 4 | 6 | 2 | 2 | 5 | 0 | 1 | 5 | 4 | 5 | 2 | 2 | 5 | 4 | 3 | 4 |
|---|---|---|---|---|---|---|---|---|---|---|---|---|---|---|---|---|---|---|---|---|---|---|---|
| 7 | 5 | 1 | 2 | 3 | 4 | 0 | 6 | 7 | 5 | 6 | 2 | 3 | 4 | 3 | 2 | 7 | 6 | 6 | 2 | 3 | 5 | 3 | 4 |
| 5 | 8 | 4 | 5 | 1 | 5 | 6 | 4 | 5 | 8 | 4 | 5 | 1 | 5 | 3 | 4 | 2 | 3 | 4 | 5 | 1 | 4 | 3 | 4 |
| 3 | 5 | 4 | 5 | 4 | 5 | 1 | 2 | 3 | 5 | 5 | 2 | 7 | 5 | 4 | 2 | 4 | 6 | 5 | 5 | 3 | 5 | 4 | 3 |
| 3 | 4 | 5 | 4 | 2 | 4 | 5 | 0 | 3 | 1 | 5 | 4 | 152 | 154 | 5 | 3 | 3 | 1 | 5 | 4 | 2 | 4 | 5 | 3 |
| 4 | 2 | 3 | 5 | 5 | 5 | 3 | 4 | 4 | 152 | 146 | 145 | 144 | 145 | 146 | 154 | 4 | 2 | 6 | 5 | 6 | 3 | 6 | 4 |
| 5 | 5 | 1 | 4 | 6 | 4 | 5 | 146 | 145 | 135 | 143 | 144 | 146 | 144 | 153 | 146 | 145 | 5 | 3 | 2 | 6 | 4 | 3 | 6 |
| 5 | 4 | 2 | 5 | 1 | 5 | 3 | 144 | 145 | 154 | 142 | 5 | 3 | 145 | 153 | 155 | 145 | 144 | 3 | 5 | 3 | 6 | 5 | 5 |
| 5 | 6 | 7 | 2 | 5 | 0 | 151 | 145 | 144 | 6 | 2 | 2 | 5 | 0 | 151 | 145 | 144 | 145 | 152 | 2 | 5 | 4 | 3 | 4 |
| 7 | 5 | 1 | 2 | 3 | 4 | 135 | 136 | 137 | 5 | 6 | 2 | 3 | 4 | 3 | 142 | 147 | 146 | 146 | 2 | 3 | 5 | 3 | 4 |
| 5 | 8 | 4 | 5 | 1 | 5 | 146 | 154 | 145 | 8 | 4 | 5 | 1 | 5 | 3 | 4 | 142 | 143 | 144 | 5 | 1 | 4 | 3 | 4 |
| 3 | 4 | 3 | 5 | 6 | 5 | 151 | 152 | 143 | 6 | 5 | 3 | 7 | 5 | 4 | 2 | 144 | 146 | 145 | 5 | 3 | 5 | 4 | 3 |
| 3 | 4 | 5 | 4 | 2 | 4 | 145 | 144 | 143 | 151 | 5 | 4 | 2 | 4 | 5 | 3 | 143 | 151 | 147 | 4 | 5 | 4 | 5 | 3 |
| 4 | 2 | 3 | 5 | 5 | 5 | 3 | 144 | 144 | 142 | 4 | 5 | 4 | 5 | 6 | 4 | 144 | 152 | 146 | 5 | 6 | 3 | 6 | 4 |
| 5 | 5 | 1 | 4 | 2 | 4 | 5 | 3 | 145 | 145 | 6 | 4 | 3 | 4 | 3 | 4 | 145 | 145 | 143 | 2 | 6 | 4 | 3 | 6 |
| 5 | 4 | 2 | 5 | 1 | 5 | 3 | 4 | 135 | 144 | 142 | 5 | 3 | 5 | 3 | 143 | 145 | 144 | 3 | 5 | 3 | 6 | 4 | 5 |
| 5 | 6 | 7 | 2 | 5 | 0 | 1 | 5 | 4 | 146 | 72 | 142 | 65 | 70 | 151 | 145 | 144 | 5 | 2 | 2 | 5 | 4 | 3 | 4 |
| 7 | 5 | 1 | 2 | 3 | 4 | 3 | 6 | 7 | 85 | 86 | 82 | 83 | 74 | 63 | 2 | 7 | 6 | 6 | 2 | 3 | 5 | 3 | 4 |
| 5 | 8 | 4 | 5 | 1 | 5 | 6 | 4 | 55 | 68 | 45 | 5 | 61 | 65 | 63 | 64 | 2 | 3 | 4 | 5 | 1 | 4 | 3 | 4 |
| 3 | 4 | 3 | 5 | 6 | 5 | 1 | 72 | 73 | 66 | 5 | 3 | 7 | 65 | 64 | 72 | 4 | 6 | 5 | 5 | 3 | 5 | 4 | 3 |
| 3 | 4 | 5 | 4 | 2 | 4 | 50 | 45 | 67 | 71 | 5 | 4 | 2 | 64 | 75 | 63 | 53 | 1 | 7 | 4 | 5 | 4 | 5 | 3 |
| 4 | 2 | 3 | 5 | 5 | 5 | 73 | 54 | 44 | 62 | 4 | 5 | 4 | 65 | 76 | 47 | 64 | 2 | 6 | 5 | 6 | 3 | 6 | 4 |
| 5 | 5 | 1 | 4 | 2 | 4 | 55 | 53 | 55 | 5 | 6 | 4 | 3 | 4 | 73 | 84 | 65 | 5 | 3 | 2 | 6 | 4 | 3 | 6 |
| 5 | 4 | 2 | 5 | 1 | 5 | 43 | 54 | 55 | 4 | 2 | 5 | 3 | 5 | 73 | 83 | 55 | 4 | 3 | 5 | 3 | 6 | 4 | 5 |

| 0 | 1 | 1 | 1 | 0 |
|---|---|---|---|---|
| 0 | 4 | 4 | 4 | 0 |
| 0 | 0 | 1 | 0 | 0 |
| 0 | 0 | 0 | 0 | 0 |
| 0 | 0 | 0 | 0 | 0 |

FIG.17A
TOP KERNEL

| 0 | 0 | 0 | 0 | 0 |
|---|---|---|---|---|
| 1 | 4 | 0 | 0 | 0 |
| 1 | 4 | 1 | 0 | 0 |
| 1 | 4 | 0 | 0 | 0 |
| 0 | 0 | 0 | 0 | 0 |

FIG.17B
LEFT KERNEL

| 0 | 0 | 0 | 0 | 0 |
|---|---|---|---|---|
| 0 | 0 | 0 | 4 | 1 |
| 0 | 0 | 1 | 4 | 1 |
| 0 | 0 | 0 | 4 | 1 |
| 0 | 0 | 0 | 0 | 0 |

FIG.17C
RIGHT KERNEL

| 0 | 0 | 0 | 0 | 0 |
|---|---|---|---|---|
| 0 | 0 | 0 | 0 | 0 |
| 0 | 0 | 1 | 0 | 0 |
| 0 | 4 | 4 | 4 | 0 |
| 0 | 1 | 1 | 1 | 0 |

FIG.17D
BOTTOM KERNEL

| 1 | 0 | 1 | 0 | 0 |
|---|---|---|---|---|
| 0 | 4 | 4 | 0 | 0 |
| 1 | 4 | 1 | 0 | 0 |
| 0 | 0 | 0 | 0 | 0 |
| 0 | 0 | 0 | 0 | 0 |

FIG. 18A
UPPER LEFT KERNEL

| 0 | 0 | 1 | 0 | 1 |
|---|---|---|---|---|
| 0 | 0 | 4 | 4 | 0 |
| 0 | 0 | 1 | 4 | 1 |
| 0 | 0 | 0 | 0 | 0 |
| 0 | 0 | 0 | 0 | 0 |

FIG. 18B
UPPER RIGHT KERNEL

| 0 | 0 | 0 | 0 | 0 |
|---|---|---|---|---|
| 0 | 0 | 0 | 0 | 0 |
| 1 | 4 | 1 | 0 | 0 |
| 0 | 4 | 4 | 0 | 0 |
| 1 | 0 | 1 | 0 | 0 |

FIG. 18C
LOWER LEFT KERNEL

| 0 | 0 | 0 | 0 | 0 |
|---|---|---|---|---|
| 0 | 0 | 0 | 0 | 0 |
| 0 | 0 | 1 | 4 | 1 |
| 0 | 0 | 4 | 4 | 0 |
| 0 | 0 | 1 | 0 | 1 |

FIG. 18D
LOWER RIGHT KERNEL o - NEW PIXEL
x - UNKNOWN PIXEL
r - PIXEL TO MODIFY

FIG. 19

| 2 | 2 | 5 | 0 | 1 | 5 | 4 | 5 | 2 | 2 | 5 | 4 | 3 | 4 |
|---|---|---|---|---|---|---|---|---|---|---|---|---|---|
| 6 | 2 | 3 | 4 | 3 | 2 | 7 | 6 | 6 | 2 | 3 | 5 | 3 | 4 |
| 4 | 5 | 1 | 5 | 3 | 4 | 2 | 3 | 4 | 5 | 1 | 4 | 3 | 4 |
|   | 3 | 3 | 3 | 4 | 2 | 4 | 6 | 5 | 5 | 3 | 5 | 4 | 3 |
|   |   |   |   | 2 | 3 | 1 | 5 | 4 | 2 | 4 | 5 | 3 |   |
|   |   |   |   |   |   | 4 | 6 | 5 | 6 | 3 | 6 | 4 |   |
|   |   |   |   |   |   |   | 4 | 2 | 6 | 4 | 3 | 6 |   |
|   |   |   |   |   |   |   |   | 5 | 3 | 6 | 5 | 5 |   |
|   |   |   |   |   |   |   |   |   | 4 | 5 | 4 | 3 | 4 |
|   |   |   |   |   |   |   |   |   | 3 | 3 | 5 | 3 | 4 |
|   |   |   |   |   |   |   |   |   | 2 | 1 | 4 | 3 | 4 |
|   |   |   |   |   |   |   |   |   | 3 | 3 | 5 | 4 | 3 |
|   |   |   |   |   |   |   |   |   |   | 5 | 4 | 5 | 3 |

| 5 | 6 | 7 | 2 | 5 | 0 | 1 | 5 | 4 | 6 | 2 | 2 | 5 | 0 | 1 | 5 | 4 | 5 | 2 | 2 | 5 | 4 | 3 | 4 |
|---|---|---|---|---|---|---|---|---|---|---|---|---|---|---|---|---|---|---|---|---|---|---|---|
| 7 | 5 | 1 | 2 | 3 | 4 | 0 | 6 | 7 | 5 | 6 | 2 | 3 | 4 | 3 | 2 | 7 | 6 | 6 | 2 | 3 | 5 | 3 | 4 |
| 5 | 8 | 4 | 5 | 1 | 5 | 6 | 4 | 5 | 8 | 4 | 5 | 1 | 5 | 3 | 4 | 2 | 3 | 4 | 5 | 1 | 4 | 3 | 4 |
| 3 | 5 | 4 | 5 | 4 | 5 | 1 | 2 | 3 | 5 | 5 | 3 | 3 | 3 | 4 | 2 | 4 | 6 | 5 | 5 | 3 | 5 | 4 | 3 |
| 3 | 4 | 5 | 4 | 2 | 4 | 5 | 2 |   |   |   |   |   | 2 | 3 | 1 | 5 | 4 | 2 | 4 | 5 | 3 |
| 4 | 2 | 3 | 5 | 5 | 4 |   |   |   |   |   |   |   |   | 4 | 6 | 5 | 6 | 3 | 6 | 4 |
| 5 | 5 | 1 | 4 | 4 |   |   |   |   |   |   |   |   |   | 4 | 2 | 6 | 4 | 3 | 6 |
| 5 | 4 | 2 | 5 |   |   |   |   |   |   |   |   |   |   | 5 | 3 | 6 | 5 | 5 |
| 5 | 6 | 7 | 4 |   |   |   |   |   |   |   |   |   |   | 4 | 5 | 4 | 3 | 4 |
| 7 | 5 | 1 | 4 |   |   |   |   |   |   |   |   |   |   | 3 | 3 | 5 | 3 | 4 |
| 5 | 8 | 4 | 3 |   |   |   |   |   |   |   |   |   |   | 2 | 1 | 4 | 3 | 4 |
| 3 | 4 | 3 | 4 |   |   |   |   |   |   |   |   |   |   | 3 | 3 | 5 | 4 | 3 |
| 3 | 4 | 5 | 3 |   |   |   |   |   |   |   |   |   |   | 4 | 5 | 4 | 5 | 3 |
| 4 | 2 | 3 | 3 |   |   |   |   |   |   |   |   |   |   | 5 | 6 | 3 | 6 | 4 |
| 5 | 5 | 1 | 3 |   |   |   |   |   |   |   |   |   |   | 4 | 6 | 4 | 3 | 6 |
| 5 | 4 | 2 | 5 |   |   |   |   |   |   |   |   |   |   | 5 | 3 | 6 | 4 | 5 |
| 5 | 6 | 7 | 2 | 2 |   |   |   |   |   |   |   |   | 3 | 2 | 5 | 4 | 3 | 4 |
| 7 | 5 | 1 | 2 | 3 | 3 |   |   |   |   |   |   | 4 | 6 | 2 | 3 | 5 | 3 | 4 |
| 5 | 8 | 4 | 5 | 1 | 5 | 6 | 23 |   |   |   |   | 27 | 2 | 3 | 4 | 5 | 1 | 4 | 3 | 4 |
| 3 | 4 | 3 | 5 | 6 | 5 | 1 | 72 | 73 | 68 | 28 | 3 | 22 | 66 | 64 | 72 | 4 | 6 | 5 | 5 | 3 | 5 | 4 | 3 |
| 3 | 4 | 5 | 4 | 2 | 4 | 50 | 45 | 67 | 71 | 5 | 4 | 2 | 64 | 75 | 63 | 53 | 1 | 7 | 4 | 5 | 4 | 5 | 3 |
| 4 | 2 | 3 | 5 | 5 | 5 | 73 | 54 | 44 | 62 | 4 | 5 | 4 | 65 | 76 | 47 | 64 | 2 | 6 | 5 | 6 | 3 | 6 | 4 |
| 5 | 5 | 1 | 4 | 2 | 4 | 55 | 53 | 55 | 5 | 6 | 4 | 3 | 4 | 73 | 84 | 65 | 5 | 3 | 2 | 6 | 4 | 3 | 6 |
| 5 | 4 | 2 | 5 | 1 | 5 | 43 | 54 | 55 | 4 | 2 | 5 | 3 | 5 | 73 | 83 | 55 | 4 | 3 | 5 | 3 | 6 | 4 | 5 |

*FIG. 22*

| 5 | 6 | 7 | 2 | 5 | 0 | 1 | 5 | 4 | 6 | 2 | 2 | 5 | 0 | 1 | 5 | 4 | 5 | 2 | 2 | 5 | 4 | 3 | 4 |
|---|---|---|---|---|---|---|---|---|---|---|---|---|---|---|---|---|---|---|---|---|---|---|---|
| 7 | 5 | 1 | 2 | 3 | 4 | 0 | 6 | 7 | 5 | 6 | 2 | 3 | 4 | 3 | 2 | 7 | 6 | 6 | 2 | 3 | 5 | 3 | 4 |
| 5 | 8 | 4 | 5 | 1 | 5 | 6 | 4 | 5 | 8 | 4 | 5 | 1 | 5 | 3 | 4 | 2 | 3 | 4 | 5 | 1 | 4 | 3 | 4 |
| 3 | 5 | 4 | 5 | 4 | 5 | 1 | 2 | 3 | 5 | 5 | 3 | 3 | 3 | 4 | 2 | 4 | 6 | 5 | 5 | 3 | 5 | 4 | 3 |
| 3 | 4 | 5 | 4 | 2 | 4 | 5 | 2 | 2 | 4 | 4 | 3 | 12 | 12 | 2 | 2 | 3 | 1 | 5 | 4 | 2 | 4 | 5 | 3 |
| 4 | 2 | 3 | 5 | 5 | 4 | 4 |   |   |   |   |   |   |   |   |   | 3 | 4 | 6 | 5 | 6 | 3 | 6 | 4 |
| 5 | 5 | 1 | 4 | 4 | 4 |   |   |   |   |   |   |   |   |   |   |   | 4 | 4 | 2 | 6 | 4 | 3 | 6 |
| 5 | 4 | 2 | 5 | 3 |   |   |   |   |   |   |   |   |   |   |   |   |   | 3 | 5 | 3 | 6 | 5 | 5 |
| 5 | 6 | 7 | 4 | 4 |   |   |   |   |   |   |   |   |   |   |   |   |   | 13 | 4 | 5 | 4 | 3 | 4 |
| 7 | 5 | 1 | 4 | 3 |   |   |   |   |   |   |   |   |   |   |   |   |   | 11 | 3 | 3 | 5 | 3 | 4 |
| 5 | 8 | 4 | 3 | 3 |   |   |   |   |   |   |   |   |   |   |   |   |   | 11 | 2 | 1 | 4 | 3 | 4 |
| 3 | 4 | 3 | 4 | 3 |   |   |   |   |   |   |   |   |   |   |   |   |   | 11 | 3 | 3 | 5 | 4 | 3 |
| 3 | 4 | 5 | 3 | 3 |   |   |   |   |   |   |   |   |   |   |   |   |   | 13 | 4 | 5 | 4 | 5 | 3 |
| 4 | 2 | 3 | 3 | 3 |   |   |   |   |   |   |   |   |   |   |   |   |   | 13 | 5 | 6 | 3 | 6 | 4 |
| 5 | 5 | 1 | 3 | 3 |   |   |   |   |   |   |   |   |   |   |   |   |   | 13 | 4 | 6 | 4 | 3 | 6 |
| 5 | 4 | 2 | 5 | 2 |   |   |   |   |   |   |   |   |   |   |   |   |   | 3 | 5 | 3 | 6 | 4 | 5 |
| 5 | 6 | 7 | 2 | 2 | 2 |   |   |   |   |   |   |   |   |   |   |   | 4 | 3 | 2 | 5 | 4 | 3 | 4 |
| 7 | 5 | 1 | 2 | 3 | 3 | 4 |   |   |   |   |   |   |   |   |   | 3 | 4 | 6 | 2 | 3 | 5 | 3 | 4 |
| 5 | 8 | 4 | 5 | 1 | 5 | 6 | 23 | 53 | 55 | 36 | 14 | 31 | 47 | 52 | 27 | 2 | 3 | 4 | 5 | 1 | 4 | 3 | 4 |
| 3 | 4 | 3 | 5 | 6 | 5 | 1 | 72 | 73 | 68 | 28 | 3 | 22 | 66 | 64 | 72 | 4 | 6 | 5 | 5 | 3 | 5 | 4 | 3 |
| 3 | 4 | 5 | 4 | 2 | 4 | 50 | 45 | 67 | 71 | 5 | 4 | 2 | 64 | 75 | 63 | 53 | 1 | 7 | 4 | 5 | 4 | 5 | 3 |
| 4 | 2 | 3 | 5 | 5 | 5 | 73 | 54 | 44 | 62 | 4 | 5 | 4 | 65 | 76 | 47 | 64 | 2 | 6 | 5 | 6 | 3 | 6 | 4 |
| 5 | 5 | 1 | 4 | 2 | 4 | 55 | 53 | 55 | 5 | 6 | 4 | 3 | 4 | 73 | 84 | 65 | 5 | 3 | 2 | 6 | 4 | 3 | 6 |
| 5 | 4 | 2 | 5 | 1 | 5 | 43 | 54 | 55 | 4 | 2 | 5 | 3 | 5 | 73 | 83 | 55 | 4 | 3 | 5 | 3 | 6 | 4 | 5 |

FIG.23

| 5 | 6 | 7 | 2 | 5 | 0 | 1 | 5 | 4 | 6 | 2 | 2 | 5 | 0 | 1 | 5 | 4 | 5 | 2 | 2 | 5 | 4 | 3 | 4 |
|---|---|---|---|---|---|---|---|---|---|---|---|---|---|---|---|---|---|---|---|---|---|---|---|
| 7 | 5 | 1 | 2 | 3 | 4 | 0 | 6 | 7 | 5 | 6 | 2 | 3 | 4 | 3 | 2 | 7 | 6 | 6 | 2 | 3 | 5 | 3 | 4 |
| 5 | 8 | 4 | 5 | 1 | 5 | 6 | 4 | 5 | 8 | 4 | 5 | 1 | 5 | 3 | 4 | 2 | 3 | 4 | 5 | 1 | 4 | 3 | 4 |
| 3 | 5 | 4 | 5 | 4 | 5 | 1 | 2 | 3 | 5 | 5 | 3 | 3 | 3 | 4 | 2 | 4 | 6 | 5 | 5 | 3 | 5 | 4 | 3 |
| 3 | 4 | 5 | 4 | 2 | 4 | 5 | 2 | 2 | 4 | 4 | 3 | 12 | 12 | 2 | 2 | 3 | 1 | 5 | 4 | 2 | 4 | 5 | 3 |
| 4 | 2 | 3 | 5 | 5 | 4 | 4 | 3 | 2 | 12 | 12 | 14 | 16 | 16 | 13 | 12 | 3 | 4 | 6 | 5 | 6 | 3 | 6 | 4 |
| 5 | 5 | 1 | 4 | 4 | 4 | 4 |   |   |   |   |   |   |   |   |   | 12 | 4 | 4 | 2 | 6 | 4 | 3 | 6 |
| 5 | 4 | 2 | 5 | 3 | 3 |   |   |   |   |   |   |   |   |   |   | 12 | 3 | 5 | 3 | 6 | 5 | 5 |   |
| 5 | 6 | 7 | 4 | 4 | 3 |   |   |   |   |   |   |   |   |   |   | 16 | 13 | 4 | 5 | 4 | 3 | 4 |   |
| 7 | 5 | 1 | 4 | 3 | 3 |   |   |   |   |   |   |   |   |   |   | 18 | 11 | 3 | 3 | 5 | 3 | 4 |   |
| 5 | 8 | 4 | 3 | 3 | 3 |   |   |   |   |   |   |   |   |   |   | 17 | 11 | 2 | 1 | 4 | 3 | 4 |   |
| 3 | 4 | 3 | 4 | 3 | 3 |   |   |   |   |   |   |   |   |   |   | 18 | 11 | 3 | 3 | 5 | 4 | 3 |   |
| 3 | 4 | 5 | 3 | 3 | 3 |   |   |   |   |   |   |   |   |   |   | 19 | 13 | 4 | 5 | 4 | 5 | 3 |   |
| 4 | 2 | 3 | 3 | 3 | 3 |   |   |   |   |   |   |   |   |   |   | 20 | 13 | 5 | 6 | 3 | 6 | 4 |   |
| 5 | 5 | 1 | 3 | 3 | 2 |   |   |   |   |   |   |   |   |   |   | 17 | 13 | 4 | 6 | 4 | 3 | 6 |   |
| 5 | 4 | 2 | 5 | 2 | 2 |   |   |   |   |   |   |   |   |   |   | 12 | 3 | 5 | 3 | 6 | 4 | 5 |   |
| 5 | 6 | 7 | 2 | 2 | 2 | 2 |   |   |   |   |   |   |   |   | 12 | 4 | 3 | 2 | 5 | 4 | 3 | 4 |   |
| 7 | 5 | 1 | 2 | 3 | 3 | 4 | 13 | 46 | 52 | 40 | 30 | 32 | 43 | 48 | 13 | 3 | 4 | 6 | 2 | 3 | 5 | 3 | 4 |
| 5 | 8 | 4 | 5 | 1 | 5 | 6 | 23 | 53 | 55 | 36 | 14 | 31 | 47 | 52 | 27 | 2 | 3 | 4 | 5 | 1 | 4 | 3 | 4 |
| 3 | 4 | 3 | 5 | 6 | 5 | 1 | 72 | 73 | 68 | 28 | 3 | 22 | 66 | 64 | 72 | 4 | 6 | 5 | 5 | 3 | 5 | 4 | 3 |
| 3 | 4 | 5 | 4 | 2 | 4 | 50 | 45 | 67 | 71 | 5 | 4 | 2 | 64 | 75 | 63 | 53 | 1 | 7 | 4 | 5 | 4 | 5 | 3 |
| 4 | 2 | 3 | 5 | 5 | 5 | 73 | 54 | 44 | 62 | 4 | 5 | 4 | 65 | 76 | 47 | 64 | 2 | 6 | 5 | 6 | 3 | 6 | 4 |
| 5 | 5 | 1 | 4 | 2 | 4 | 55 | 53 | 55 | 5 | 6 | 4 | 3 | 4 | 73 | 84 | 65 | 5 | 3 | 2 | 6 | 4 | 3 | 6 |
| 5 | 4 | 2 | 5 | 1 | 5 | 43 | 54 | 55 | 4 | 2 | 5 | 3 | 5 | 73 | 83 | 55 | 4 | 3 | 5 | 3 | 6 | 4 | 5 |

FIG.24

| 5 | 6 | 7 | 2 | 5 | 0 | 1 | 5 | 4 | 6 | 2 | 2 | 5 | 0 | 1 | 5 | 4 | 5 | 2 | 2 | 5 | 4 | 3 | 4 |
|---|---|---|---|---|---|---|---|---|---|---|---|---|---|---|---|---|---|---|---|---|---|---|---|
| 7 | 5 | 1 | 2 | 3 | 4 | 0 | 6 | 7 | 5 | 6 | 2 | 3 | 4 | 3 | 2 | 7 | 6 | 6 | 2 | 3 | 5 | 3 | 4 |
| 5 | 8 | 4 | 5 | 1 | 5 | 6 | 4 | 5 | 8 | 4 | 5 | 1 | 5 | 3 | 4 | 2 | 3 | 4 | 5 | 1 | 4 | 3 | 4 |
| 3 | 5 | 4 | 5 | 4 | 5 | 1 | 2 | 3 | 5 | 5 | 3 | 3 | 3 | 4 | 2 | 4 | 6 | 5 | 5 | 3 | 5 | 4 | 3 |
| 3 | 4 | 5 | 4 | 2 | 4 | 5 | 2 | 2 | 4 | 4 | 3 | 12 | 12 | 2 | 2 | 3 | 1 | 5 | 4 | 2 | 4 | 5 | 3 |
| 4 | 2 | 3 | 5 | 5 | 4 | 4 | 3 | 2 | 12 | 12 | 14 | 16 | 16 | 13 | 12 | 3 | 4 | 6 | 5 | 6 | 3 | 6 | 4 |
| 5 | 5 | 1 | 4 | 4 | 4 | 4 | 12 | 13 | 15 | 19 | 20 | 21 | 21 | 21 | 16 | 12 | 4 | 4 | 2 | 6 | 4 | 3 | 6 |
| 5 | 4 | 2 | 5 | 3 | 3 | 3 | 14 | 20 | 22 | 24 | 17 | 18 | 27 | 26 | 22 | 16 | 12 | 3 | 5 | 3 | 6 | 5 | 5 |
| 5 | 6 | 7 | 4 | 4 | 3 | 12 | 16 | 23 | 19 | 19 | 18 | 19 | 21 | 31 | 27 | 22 | 16 | 13 | 4 | 5 | 4 | 3 | 4 |
| 7 | 5 | 1 | 4 | 3 | 3 | 11 | 17 | 23 | 19 | 18 | 18 | 18 | 23 | 23 | 29 | 24 | 18 | 11 | 3 | 3 | 5 | 3 | 4 |
| 5 | 8 | 4 | 3 | 3 | 3 | 11 | 18 | 24 | 21 | 18 | 17 | 20 | 21 | 22 | 21 | 24 | 17 | 11 | 2 | 1 | 4 | 3 | 4 |
| 3 | 4 | 3 | 4 | 3 | 3 | 12 | 18 | 23 | 20 | 21 | 18 | 19 | 20 | 20 | 21 | 24 | 18 | 11 | 3 | 3 | 5 | 4 | 3 |
| 3 | 4 | 5 | 3 | 3 | 3 | 11 | 15 | 22 | 27 | 30 | 35 | 24 | 19 | 21 | 22 | 25 | 19 | 13 | 4 | 5 | 4 | 5 | 3 |
| 4 | 2 | 3 | 3 | 3 | 3 | 2 | 13 | 17 | 34 | 40 | 37 | 33 | 24 | 20 | 22 | 25 | 20 | 13 | 5 | 6 | 3 | 6 | 4 |
| 5 | 5 | 1 | 3 | 3 | 2 | 2 | 2 | 21 | 49 | 43 | 37 | 34 | 33 | 23 | 19 | 23 | 17 | 13 | 4 | 6 | 4 | 3 | 6 |
| 5 | 4 | 2 | 5 | 2 | 2 | 2 | 3 | 36 | 49 | 50 | 36 | 35 | 37 | 32 | 22 | 16 | 12 | 3 | 5 | 3 | 6 | 4 | 5 |
| 5 | 6 | 7 | 2 | 2 | 2 | 2 | 6 | 34 | 52 | 42 | 40 | 35 | 42 | 43 | 18 | 12 | 4 | 3 | 2 | 5 | 4 | 3 | 4 |
| 7 | 5 | 1 | 2 | 3 | 3 | 4 | 13 | 46 | 52 | 40 | 30 | 32 | 43 | 48 | 13 | 3 | 4 | 6 | 2 | 3 | 5 | 3 | 4 |
| 5 | 8 | 4 | 5 | 1 | 5 | 6 | 23 | 53 | 55 | 36 | 14 | 31 | 47 | 52 | 27 | 2 | 3 | 4 | 5 | 1 | 4 | 3 | 4 |
| 3 | 4 | 3 | 5 | 6 | 5 | 1 | 72 | 73 | 68 | 28 | 3 | 22 | 66 | 64 | 72 | 4 | 6 | 5 | 5 | 3 | 5 | 4 | 3 |
| 3 | 4 | 5 | 4 | 2 | 4 | 50 | 45 | 67 | 71 | 5 | 4 | 2 | 64 | 75 | 63 | 53 | 1 | 7 | 4 | 5 | 4 | 5 | 3 |
| 4 | 2 | 3 | 5 | 5 | 5 | 73 | 54 | 44 | 62 | 4 | 5 | 4 | 65 | 76 | 47 | 64 | 2 | 6 | 5 | 6 | 3 | 6 | 4 |
| 5 | 5 | 1 | 4 | 2 | 4 | 55 | 53 | 55 | 5 | 6 | 4 | 3 | 4 | 73 | 84 | 65 | 5 | 3 | 2 | 6 | 4 | 3 | 6 |
| 5 | 4 | 2 | 5 | 1 | 5 | 43 | 54 | 55 | 4 | 2 | 5 | 3 | 5 | 73 | 83 | 55 | 4 | 3 | 5 | 3 | 6 | 4 | 5 |

FIG.25

METHOD AND APPARATUS FOR OBSCURING FEATURES OF AN IMAGE

This is a continuation of application Ser. No. 08/230,195, filed Apr. 20, 1994, now U.S. Pat. No. 5,710,839.

BACKGROUND OF THE INVENTION

1. Field of the Invention

The present invention is directed to a system for automatically obscuring undesirable features in an image region which system combines image convolution and erosion to pull features outside the region into the region using a specially designed kernel, a shaped region of interest adapted to reduce artifacts while obscuring undesirable features and local information.

2. Description of the Related Art

Image processing techniques which improve the appearance of images are well known. Methods for the global reduction of image information in an image are also well known. For example, an image can be made less sharp by blurring the entire image with a convolution whose kernel elements are chosen to suit the particular need. Information describing an image can also be produced with the application of algorithms which compute various features within an image. For example, successive applications of erosion and dilation operations can be used to extract information pertaining to the structure of features within an image.

Techniques for the local enhancement of image information are also well known. Such techniques seek to improve the apparent quality of an image in a restricted area or attempt to derive information about an object in an image.

There are also many standard methods for removing image information which rely on operator interaction. Image editing software tools provide air brushing capability, cloning operations and the like to remove image features directly under the operator's artistic control. Such methods are not automated and all require the supervision of the operator.

Automatic operations which endeavor to effectively obscure portions of an image (indicated by an operator) while leaving the rest of the image unaffected are more difficult (and less sophisticated). Such operations must avoid destroying the overall appearance of the image or its image quality. At the same time, the obscured image portion must not be obvious to the eye and, when more closely examined, should appear as a normal part of the image but without the undesirable features.

What is needed is an automatic operation that merges information outside a region with information inside the region to obscure undesirable features while retaining some of the characteristics of the information in the region and being pleasing to the eye.

SUMMARY OF THE INVENTION

It is an object of the present invention to provide a method for the local obscuration of objectionable features within an image without degrading the overall quality of the image, creating obtrusive artifacts or creating perceptible discontinuities within the image.

It is another object of the present invention to allow a user to designate regions of an image which include undesirable information and to process the regions to obscure the undesirable features in a way pleasing to the eye.

It is also an object of the present invention to provide a system that uses a shape of a region to be obscured that improves the perceived quality of the final image by reducing processing artifacts.

It is a further object of the present invention to provide a kernel that improves the efficiency of the obscuration process.

It is an additional object of the present invention to merge information outside a region with information inside the region to obscure undesirable features in the information in the region.

The above objects can be attained by a method and system that obscures image features in a region of interest designated by a user. The process includes designation by an operator using a computer of a special shaped region of interest and the automatic convolution by the computer using a specially designed kernel with the image data. The kernel is designed to pull features outside the border of the region into the region making the region blend naturally with the surroundings while not completely eliminating the image details within the region. The kernel is also designed for efficient computation requiring only adds and shifts. The kernel is applied iteratively from the border of the region to the center. Once the region of interest is obscured the image will not include undesirable features and can be made available for viewing or printing.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 depicts an area being processed;

FIGS. 5A–5D illustrate kernels applied to the image of FIG. 4;

FIG. 6 depicts a first processing level;

FIG. 7A illustrates a kernel applied to the image;

FIG. 7B depicts processing results;

FIG. 8 illustrates a first level of processed results;

FIG. 9 illustrates a second level;

FIG. 10 depicts a final level;

FIGS. 11–13 depict different final levels;

FIGS. 14A–14D depict reduced kernels;

FIGS. 16A and 16B illustrate the image region digitally;

FIGS. 17A–17D and 18A–18D illustrate kernels applied to the elliptical region;

FIG. 19 depicts pixels to be processed;

FIG. 20 illustrates the results of processing the pixels of FIG. 19;

FIG. 22 illustrates the processing results for the entire first level;

FIG. 23 illustrates two levels of processing;

FIG. 24 illustrates three levels of processing; and

FIG. 25 depicts all pixels processed.

DESCRIPTION OF THE PREFERRED EMBODIMENTS

Figure 1:
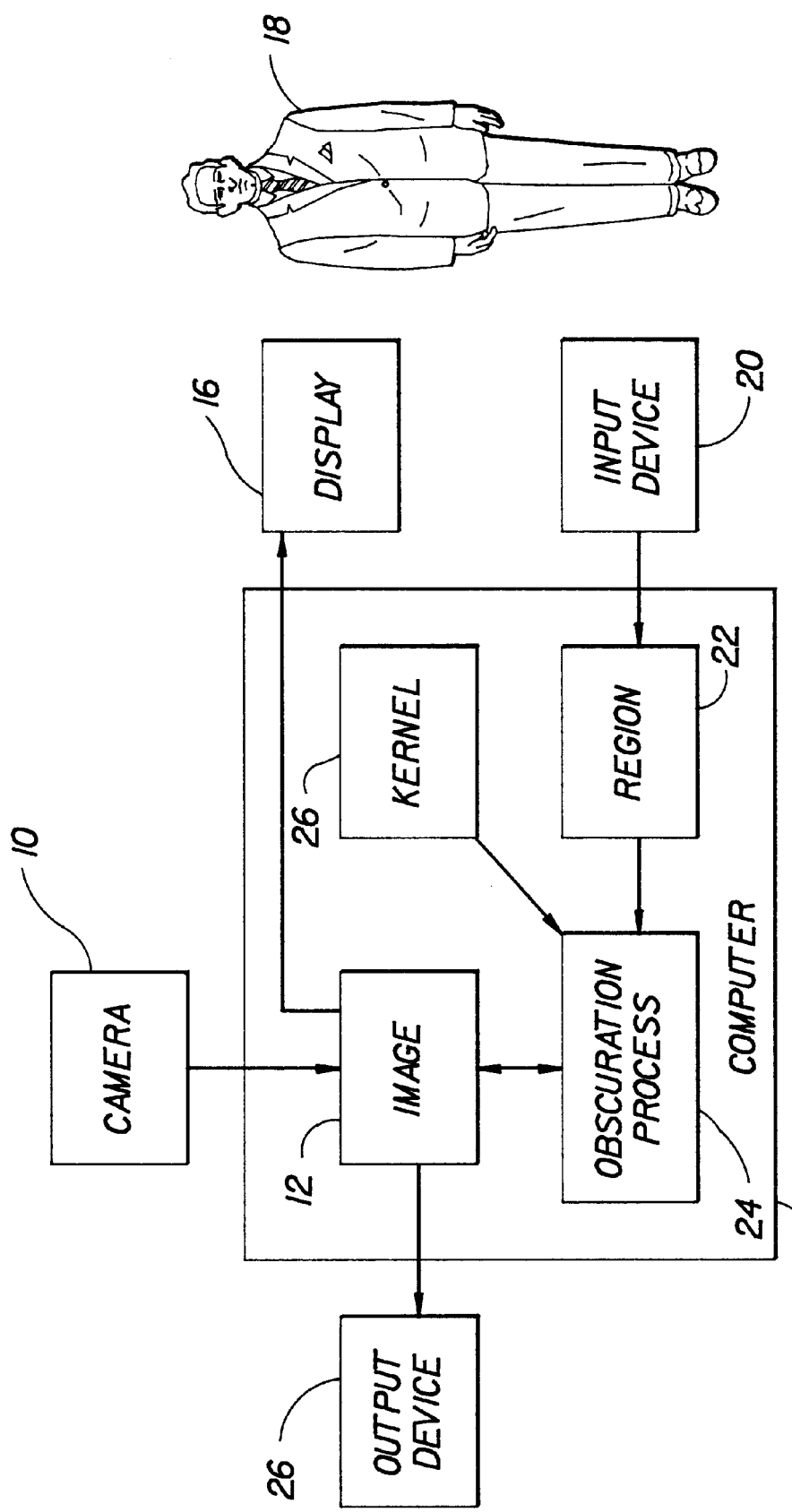
FIG. 1 depicts the typical hardware components of the present invention.

The present invention as illustrated in FIG. 1 includes a camera 10, such as a the Eastman Kodak Co. DCS200 camera, which captures an image 12 of about 4 megabytes that includes features that are undesirable. Although a camera image source is shown the image source could be other devices such as an image storage device like a compact disk. The image 12 once it is received is stored in a computer 14, such as the SUNSPARK workstation from Sun Microsystems or the Kodak EktronBOSS processor having matrix process accelerators, and used to drive a display 16. An operator 18 through a conventional input process and device 20, such as a mouse, designates the location and size of a region of interest in the image 12 in which details are to be obscured. The region designation is stored in a location 22 of the memory of the computer 14. Once all the regions that need-to be obscured within the image 12 are designated, an obscuration process 24 using the region designation 22 and a kernel 26 automatically performs the obscuration using a conventional convolution technique in which the kernel is iteratively applied from the outside to the center to obscure the details in the image 12 in the region of interest. Once the image processing is complete the image 12 may be viewed on the display 16 or output to an output device 26, such as a printer like the Kodak XL thermal printer.

The iterative method mentioned above provides for the efficient obscuration of image features using a related family of two-dimensional kernels which are applied to the border of the image feature area first and then successively moved to the center of the image feature area. The kernel combines information from the border of the obscured area with information within the obscured area. The construction of the kernel is such that the application of the kernel to the image is extremely efficient computationally. The features of the kernel which improve efficiency and image quality include: making all element values a power of two, so that only shifts (instead of multiplies) and adds are required; making the sum of the kernel elements a power of two; pixels adjacent to the target pixel at the same level not contributing to the obscured pixel element values; requiring a minimum number of shifts; the kernel shape matching the shape of the region being obscured; tracking the position of kernel elements with respect to data is simple; minimizing the number of intermediate copies of data by providing that the original can be overwritten; and supporting extensive parallel processing.

Figure 2:
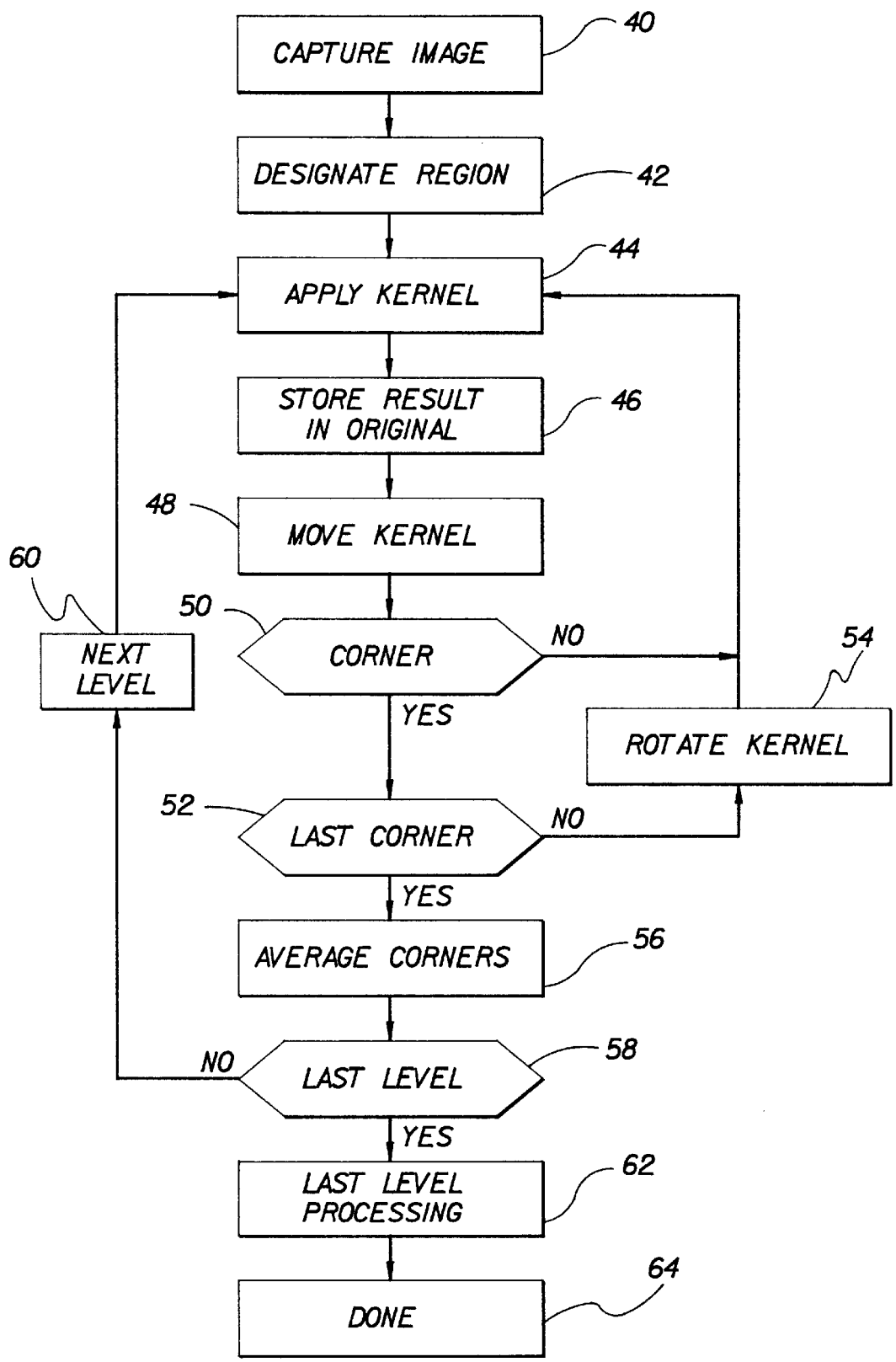
FIG. 2 depicts the steps of the process of the present invention.
Figure 3:
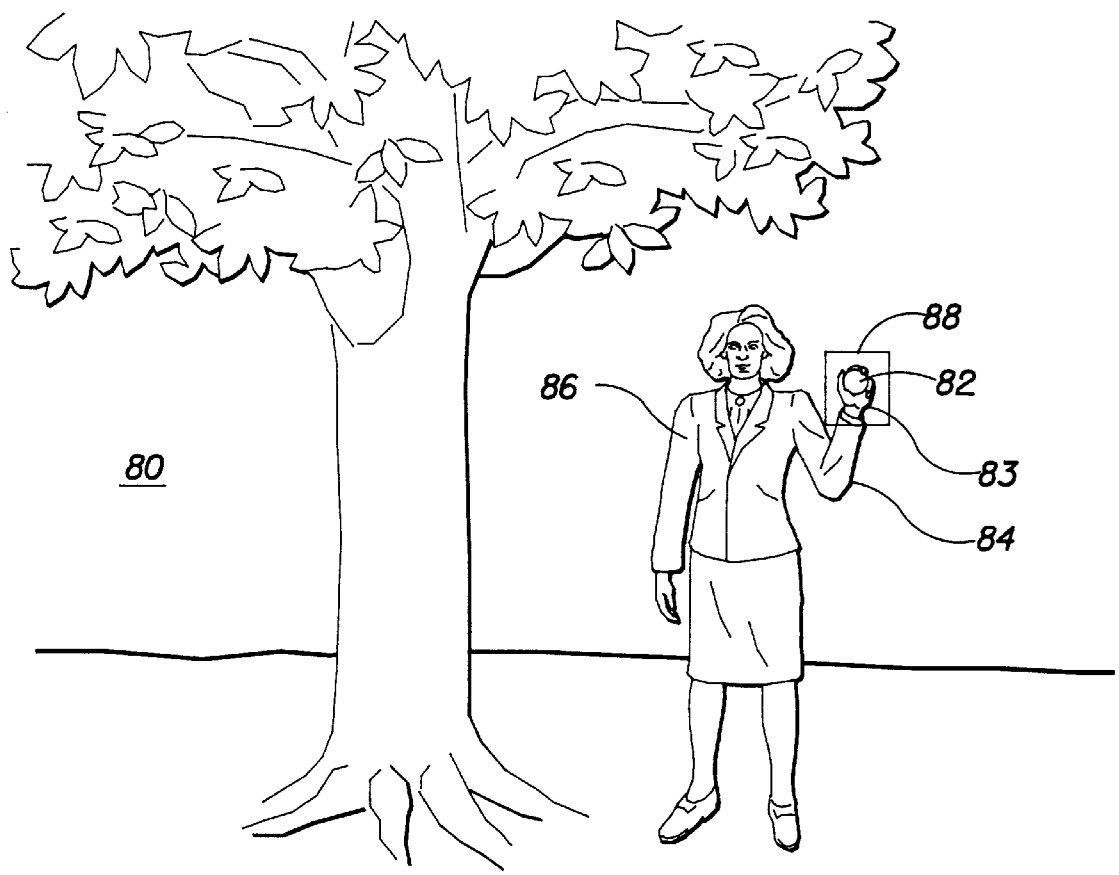
FIG. 3 illustrates an image to which the invention is to be applied.

The automatic method for obscuring image features of the present invention does so without degrading the overall image quality, creating image artifacts, or creating perceptible discontinuities within the image. The method, as illustrated in FIG. 2, can start with the capture 40 of an image which includes one or more undesirable features. The only operator 18 input then required is to designate or indicate 42 a region of interest requiring obscuration. A simplified, artificial image 80 is shown in FIG. 3. The feature which will be obscured within this image is the ball 82 in the hand 83 at the end of the left arm 84 of the human FIG. 86 on the right side of the artificial image 80.

The area to be obscured is selected as being within a rectangle 88 by the operator 18. Such a rectangle is shown in FIG. 3, is drawn with a dotted line, and completely surrounds or encloses the area to be obscured. Once the area of interest is selected, the operator's task is complete and the processing proceeds automatically with the application 44 of the kernel to the image.

Figure 4:
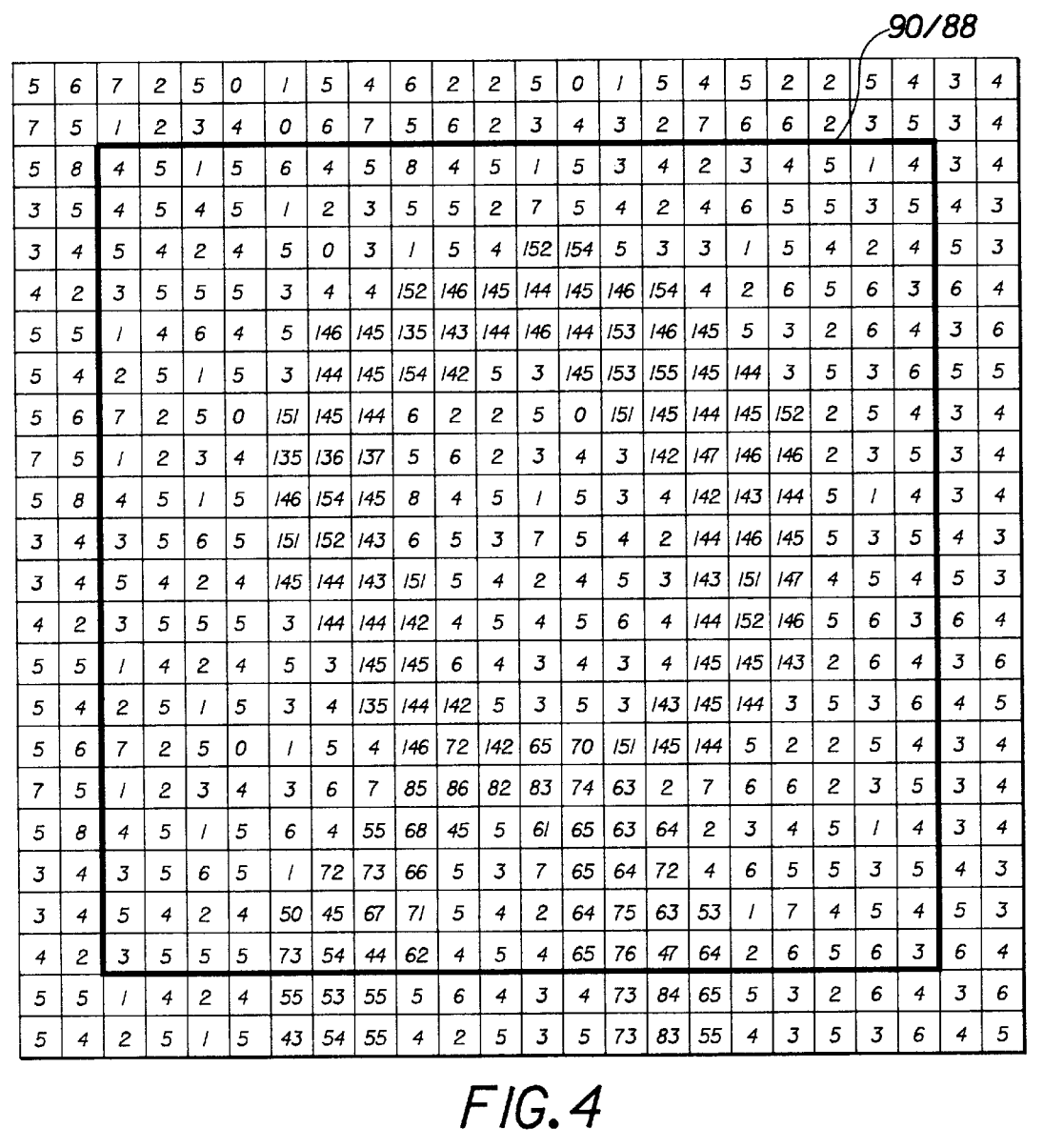

The area to be obscured can be digitally, rather than pictorially, represented by FIG. 4. In this figure, the background has pixel values in the zero to ten range, the hand 83 has values in the 40 to 70 range, and the ball or circle 82 has values in the 130 to 160 range. The area within the dark bordered box 90 is to be obscured.

Four separate kernels are used to obscure the region of interest each with a rectangular shape matching the rectangular shape of the region. Each kernel is used on one of the four sides of the rectangular region of interest. Alternatively, the kernels can be considered as the same kernel but rotated when applied to each of the four sides. That is, each kernel is symmetric inside the kernel about a normal to the surface and each kernel is rotationally symmetric. That is, if the kernel is rotated and applied to the same data the same result will be produced. The four kernels are shown in FIGS. 5A–5D. Each kernel includes an element for the pixel of interest and for pixels exterior to the pixel of interest and exterior to the current level and which are considered complete or have had their processing, if any completed. The obscuration process proceeds iteratively, from the outside layers, or levels, of the region-of-interest to the inside. The first level, as illustrated in FIG. 6 is composed of the rows and columns touching the inside of the dark border and is the first to be processed. The second level is the rows and columns just inside the first level and so on. Each level is processed before the next, although some computations may be performed concurrently where there is no arithmetic dependency and the image can be divided into tiles for processing by different processors when multiple processors are available. The process applies 44 the kernel to the data which can be a conventional convolution operation or a specialized operation that takes account of the characteristics of the kernels as discussed below. The results are stored 46 in the original matrix and the kernel is moved 48 by incrementing the pointers. If the process is not operating on the sides in parallel as would occur when parallel processors are involved, the process determines whether 50 a corner has been reached and whether 52 the last corner has been reached. If the last corner has not been reached 50 the kernel is rotated 54 and applied 44 again. When the last corner has been reached the corners may need to be processed 56. If the level is not the last level 58, the kernel is moved 60 down a level and level processing starts again. If the last level has been reached special final center processing may need to be performed 62, the image is complete 64 and may be viewed or printed. Because the length of each side is gradually shrinking and the corners are moving inward the process must keep track of the processing position as well as the level. A person of skill in the art can provide the appropriate pointers and pointer adjustments for this.

As noted above, the first level is processed first. Every pixel in the level can be processed independently of every other so that some degree of parallel processing is simple to obtain, even though the process steps discussed above process the sides sequentially. During processing along the top row (excluding the corners), each pixel in the first level is replaced by the convolution of the pixel area with the top kernel shown in FIG. 7A. This operation is shown in FIG. 7A for the pixel whose value is 5 and is located in row 3 column 4 (starting the count from top row and left most column). To clarify the illustration, the interior levels and corners are not shown. The darkly bordered box is shown enclosing the pixels whose convolution coefficients are non-zero. Thus, the resulting pixel value is $((2\times1)+(5\times1)+(1\times4)+(2\times4)+(3\times4)+(4\times1)+(5\times1))/16=2.5$ or more simply because of the design of the kernel $((2+5+5+4)+(1+2+3)\times 4)/16=2.5$. This rounds (for integer-valued pixels) to 2. The result is shown in row 3, column 4 of FIG. 7B. The results for the rest of the beginning of that row are shown as well as the results for the beginning of the column. All of the new pixel values are shown in a bold font.

The corner pixels can be computed by averaging the results of the convolutions using the two relevant kernels.

Thus the upper, left corner pixel value in the first level shown here will average the result of the top kernel for that pixel location (result is 3) and the result of the left kernel for that location (result is 5). The average value is therefore 4. As an alternative and for a faster computation one of the kernel pixels can be arbitrarily chosen, for example always choose the top and bottom kernel results for the corners. However, since the kernels pull information from different areas of the image the final result will be different though generally the difference would not be noticeable. FIG. 8 shows the overall result for the calculation at level 1. The pixels in level 1 (between the dark lines) have been replaced, all others are left alone.

After level 1 has been computed, level 2 pixels can be computed. The level two pixels are shown in FIG. 9 between the dark lines. These pixels are replaced in exactly the same manner as for level 1. This procedure repeats until one level remains. If, as is shown in FIG. 10, there are an even number of pixels in the center of region of interest, a two-by-two area of pixels will remain at the last level. Each of these four pixels can be treated as a corner in exactly the same way as before. The resulting, completely processed region of interest is shown in FIG. 10.

The final level shown in FIG. 10 will occur when the region of interest is square and has an even number of pixels in each dimension. If the area is square but has an odd number of pixels in each dimension, the last level will contain a single pixel as shown in FIG. 11. (FIGS. 11 through 14 show only the last few levels of a larger region of interest.) In this case, the central pixel (originally 19) can be replaced by the average of all four kernel operations (top, left, right and bottom). In this case, the value of the top kernel is 19, the value of the left kernel is 22, the value of the right kernel is 21, and the value of the bottom kernel is 23, for an average value of 21. The pixel value of 21 will thus replace the original, central value of 19. For a faster computation as an alternative the pixel for one of the kernels can be arbitrarily selected as previously mentioned.

If the region of interest is not square, but is rectangular the final level will be either a pair of lines or a single line depending on whether an even or odd number of lines or columns are included in the region of interest. The case for a pair of lines is illustrated in FIG. 12. In this case, no special procedures need to be invoked, since normal operation will reduce the final level. In the latter case, FIG. 13, a special procedure, analogous to that of FIG. 11, must be used.

In the case of a remaining line for the last level, the end pixels can be replaced with the average of the top, left or right, and bottom kernels. In the FIG. 13 example, the results are 21, 17 and 19 for the top, left and bottom kernels respectively, so the replacement value would be the average of those three values, or 19. On the right side, the top, right and bottom kernels would be applied, and the average of those three results used. For the pixels not on the end, the top and bottom kernels would be applied and their results averaged. For example, the pixel value 29 which is second from the left in the last level of FIG. 13 has a top kernel value of 23, and a bottom kernel result of 24. The average result is then 23.

FIG. 13 illustrates the case in which the horizontal dimension of the region of interest is greater than the vertical, resulting in a horizontal line for the last level. If the vertical dimension is greater than the horizontal, a vertical line results. This case is treated in a similar way. The resulting end pixels are averaged from the left, right and top or bottom kernels. The remaining pixels are the result of averaging the values derived from applying the left and right kernels.

The procedures described above are very computationally efficient on binary, digital computers. No multiply or divide operations need to be done, only shifts and adds. Tracking the location of the pixel arguments for the kernels is more work, but the total is much less than required for a conventional convolution, for example. In addition, the special cases FIGS. 11 through 12, only pertain to regions of interest with odd dimensions. If the regions of interest are restricted to even row or column sizes, the special cases do not obtain and further simplification can be achieved.

If an image has a lot of high frequency detail, the procedure outlined above can result in a perceptibly visible border around the obscured area. This can be reduced by using the slightly smaller kernels shown in FIGS. 14A–14D. These kernels are effectively lower powered versions of those previously described. By applying them in the same manner at the first few levels of the region of interest, a more gradual, less perceptible edge is obtained. The number of levels for which the smaller kernels are used is image or application dependents Note that the smaller kernels exhibit even greater computational efficiencies than the larger ones, since fewer adds and shifts are needed to implement them.

The iterative use of these kernels in the manner described above effectively obscures image information without creating objectionable artifacts. This occurs because the method as described combines some information from within the obscured area with blurred information from the edge of the area while not pulling information from pixels beside or on the same level. As the iterations proceed, the edge information is pulled into the region of interest. Thus, the effective obscuration increases as the iterations proceed providing a smooth transition from the relatively unaffected border regions to the interior of the obscured area. There are three simultaneous activities occurring. First, the local pixels are blurred as with a typical convolution in which adjacent pixels at the same level are combined; this effectively reduces the image detail. Second, information from within the region of interest is incorporated into the obscured pixels; this reduces the perception of artifacts within the obscured area. Third, information from the edge of the region of interest is moved into the obscured area, effectively providing structural continuity for the image as well as covering the objectionable image information. In addition, information from the outer reaches of the region is dragged into the center or middle.

Examination of FIG. 10 will show that the detail has been effectively removed while some structure remains without creating a clear edge in the processed area. Note that a digital representation of an image area cannot be used to provide a visually accurate representation of the actual image processing.

Figure 15:
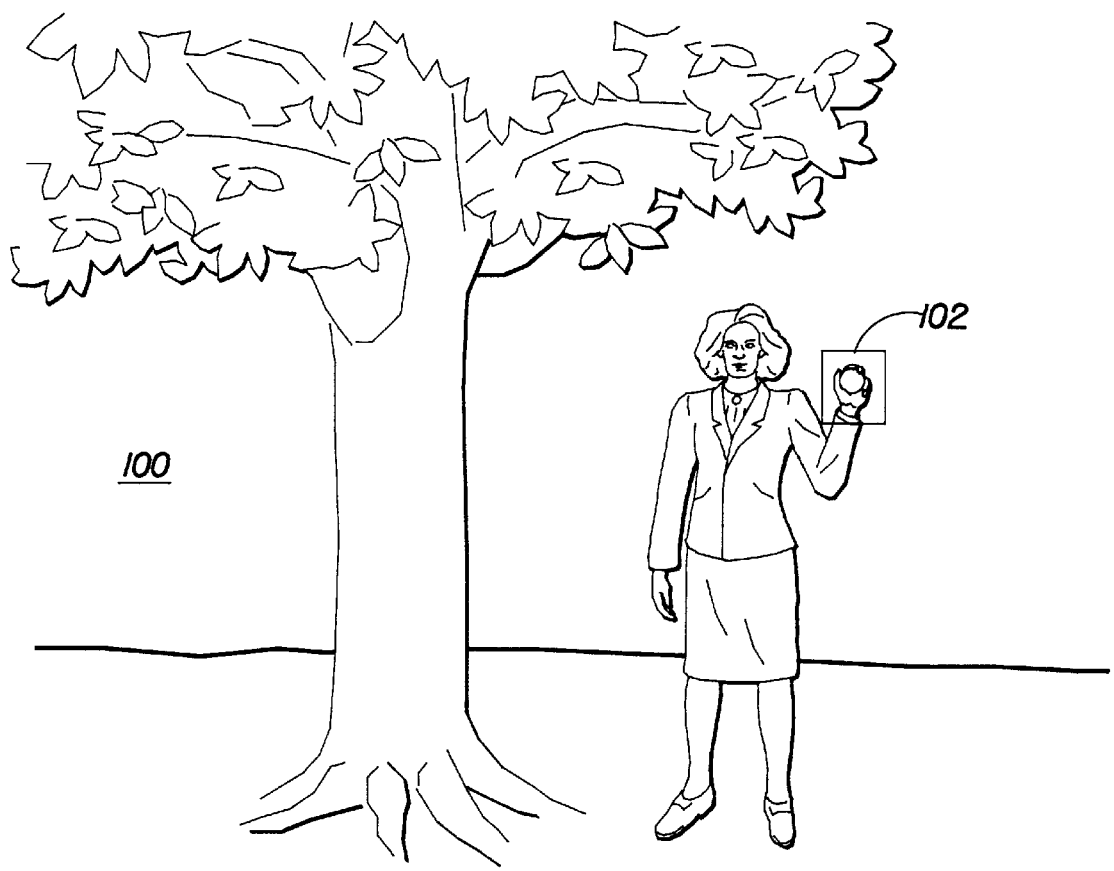
FIG. 15 depicts an elliptical region of interest.

The present invention can be improved by applying a differently shaped region of interest to the image along with kernels shaped to match the change in the shape region of the region of interest. A second simplified artificial image 100 used to depict improved region of interest is shown in FIG. 15. The feature which will be obscured within this image is again the ball 82 at the end of the human figure's left arm 84 on the right side of the artificial image. The area to be obscured is selected within an ellipse 102 by an operator. The ellipse 102 completely surrounds the area to be obscured.

Figure 16B:
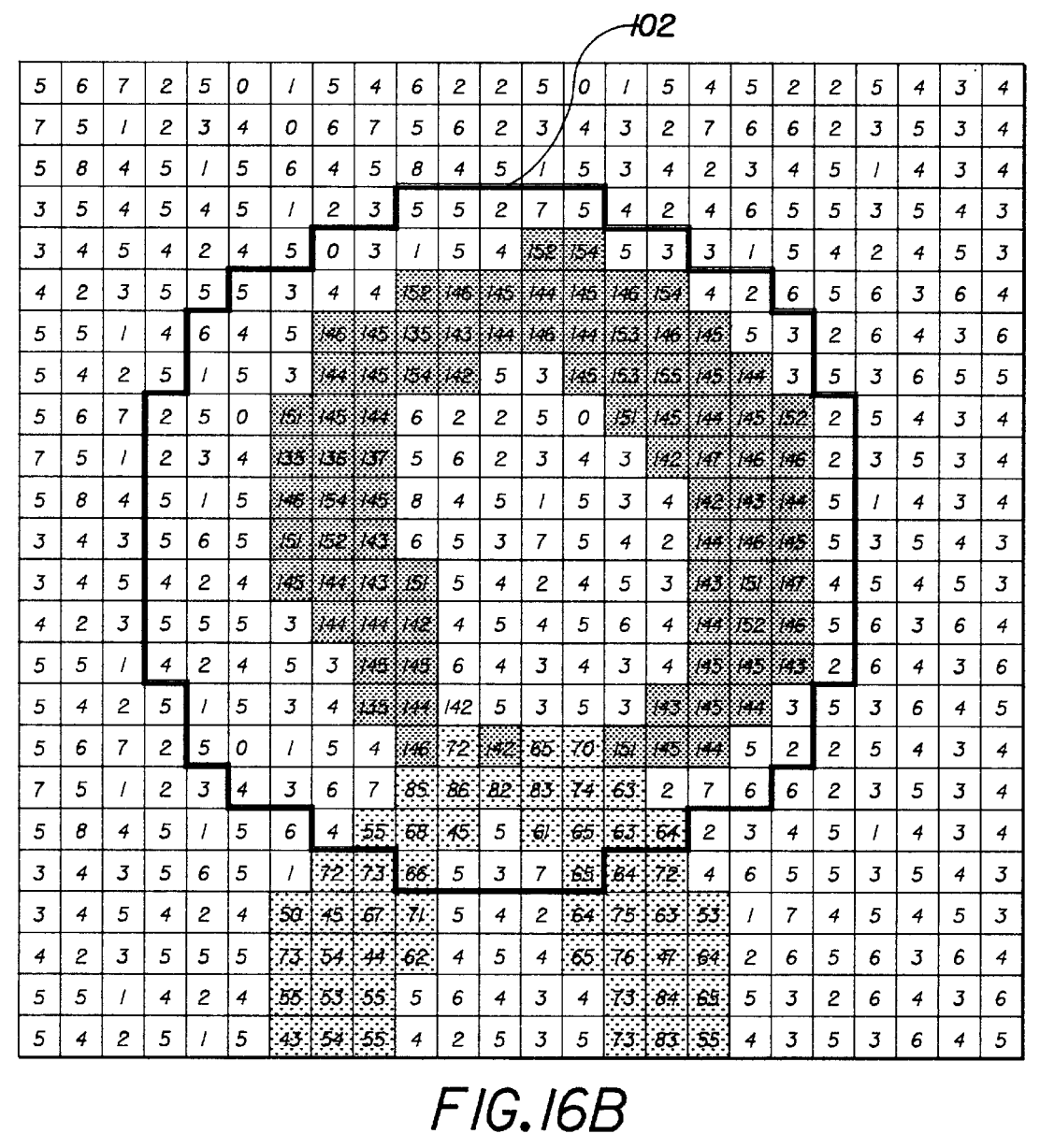

The elliptical area to be obscured can be digitally, rather than pictorially, represented by FIG. 16A. In this figure, the background has pixel values in the 0 to 10 range, the hand has values in the 40 to 70 range, and the circle or ball 82 has values in the 130 to 160 range. The area within the darkly bordered digitized ellipse 102 is to be obscured. To clarify the illustration pictorially, FIG. 16B adds a light background to each pixel area for the hand, and a darker background shade for each pixel of the circle or ball 82.

Eight separate kernels are used to obscure the region of interest each with a shape corresponding to the shape of the region with which it is used, thereby drawing information into the region from the appropriate direction. The kernels are "V-shaped" recognizing that the kernels are to pull from regions exterior to the curved surface of the ellipse 102. Each kernel is used on one of the eight possible regions of interest for the pixel configurations. Note that these kernels can also be applied to a region of arbitrary shape by merely sharpening the "V" as the associated region curve gets sharper and broadening the "V" as the region curve gets shallower until the flat kernels of the previously discussed embodiment are produced. This will of course require fewer or more kernels for the curve depending on its shape and may increase processing overhead. The eight kernels for this particular ellipse 102 can be divided into two groups, one of which comprises edge kernel reflections as illustrated in FIGS. 17A–17D, and the second of which comprises corner kernel reflections as illustrated in FIGS. 18A–18D. These kernels are all normalized by dividing by 16 as in the previous embodiment.

Every pixel within the area to be obscured must be replaced with a new pixel value. As in the previous embodiment, the obscuration proceeds iteratively, from the outside layers, or levels, of the region-of-interest to the inside. The first level is composed of the pixels contiguous with the inside of the dark border and is the first to be processed. The second level is composed of the pixels just inside the first level and so on. Each level is processed before the next (although some computations may be done at the same time if there is no arithmetic dependency as in the previous embodiment).

Every unknown pixel with three known pixels on the line above, where one pixel is directly above and the other two are on either side of the one above, can be calculated using the kernel of FIG. 17A. Likewise, every unknown pixel with three known pixels on the line to the right, where one pixel is directly to the right and the other two are above and below the pixel on the right, can be calculated using the kernel of FIG. 17C. Every unknown pixel with known pixels above, to the right, and diagonally above and to the right can be calculated using the kernel of FIG. 18B. The corresponding situations for the upper left, and lower right and left quadrants are similar, using the appropriately reflected kernels. It is possible that more than one kernel may be usable. In that case, either kernel may be chosen. (The corner kernel is chosen here.) Alternatively, both convolutions can be calculated and the average used as in the previous embodiment.

Note that not every pixel contiguous with a known pixel can be calculated on a given level of processing. The appropriate neighborhood of known pixels must first exist. However, as the erosive process continues iteratively, every pixel will eventually be filled in.

At any one, level, only the pixels whose kernel elements are combined with new pixels can be modified (except for the pixel of interest at the center of the kernel). Pixels whose kernel elements are zero are ignored. New pixels (those whose new values are already determined) are those which are not in the elliptical region of interest 102 or ones replaced at a previous level calculation.

Figure 19:
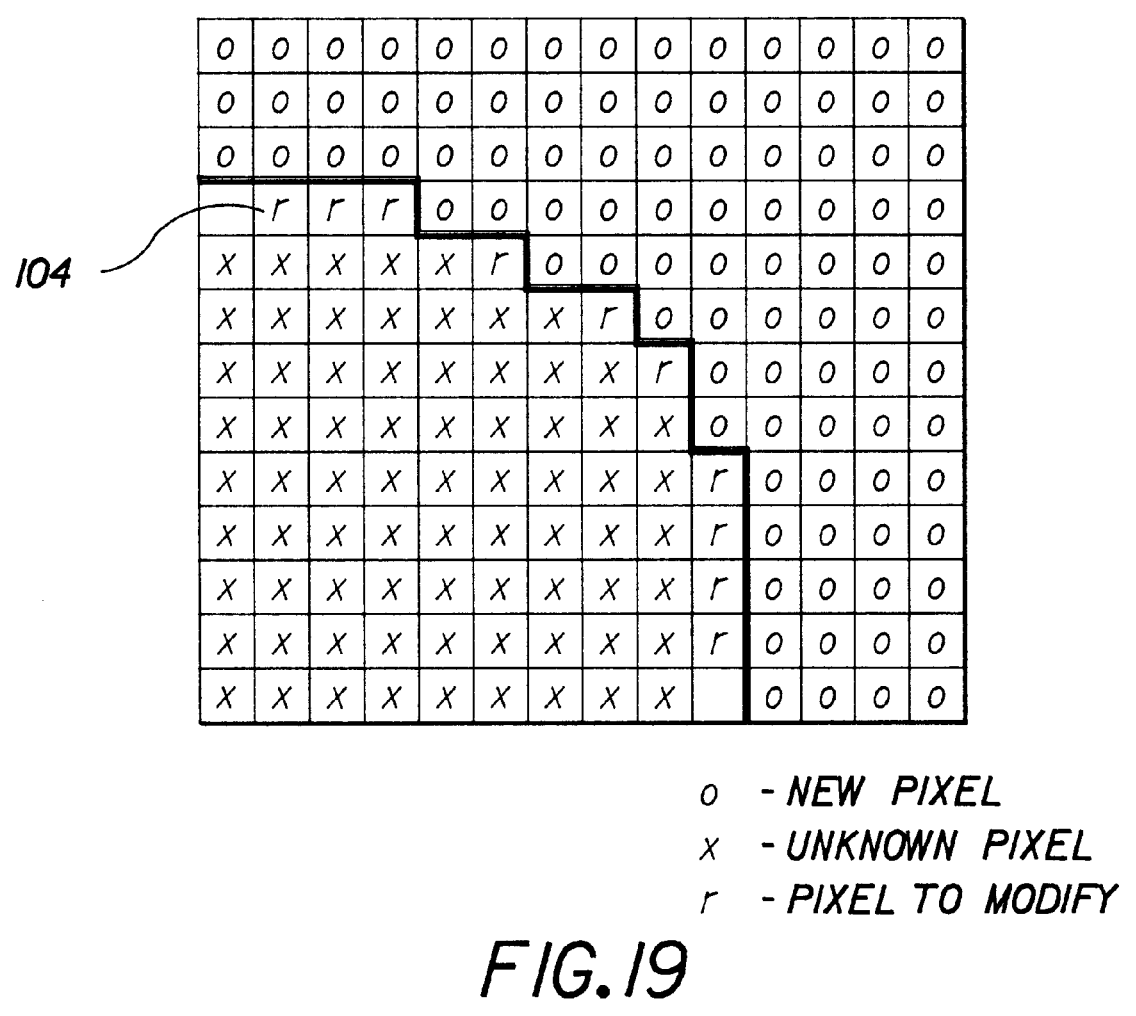

The various configurations for kernel application are illustrated in FIG. 19 for pixels in the upper right quadrant of the elliptical region of interest. The pixels and their positions are indicated with square boxes as in the previous figures. Boxes filled with an 0 represent known or previously modified pixels. Boxes filled with an x represent pixels that have not yet been modified. Boxes filled with a bold r indicate pixels that have not yet been modified but that can be modified given the existing known and modified pixels.

Empty boxes are at the edge of the area and are ignored. As with a convolution, a neighborhood of pixels is required for this calculation; those pixels without a defined neighborhood must be treated separately. Those pixels are not considered here and may be filled according to some other scheme or simply left with their existing value. Generally, however, this problem does not arise because the area to be obscured is not at the very edge of the image data. Given this, every pixel in the area to be obscured will have a neighborhood.

FIG. 20 completes the FIG. 19 example using pixel values from FIG. 16A. The r boxes have been filled using the convolution values from the appropriate kernels. The original pixel in the upper left r box location 104 is 2 (from FIG. 16A). Thus, the upper left r values in FIG. 19 is computed using the top kernel, so that the resulting pixel value is $((6\times1)+(2\times1)+(3\times1)+(4\times4)+(5\times4)+(1\times4)+(2\times1))/16=3.3125$ or more simply because of the design of the kernel $((6+2+3+2)+(4+5+1)\times4)/16=3.3125$. This rounds (for integer-valued pixels) to 3. Where either a corner or side kernel could be used, an arbitrary choice is preferably made to apply the corner kernels.

Figure 21:
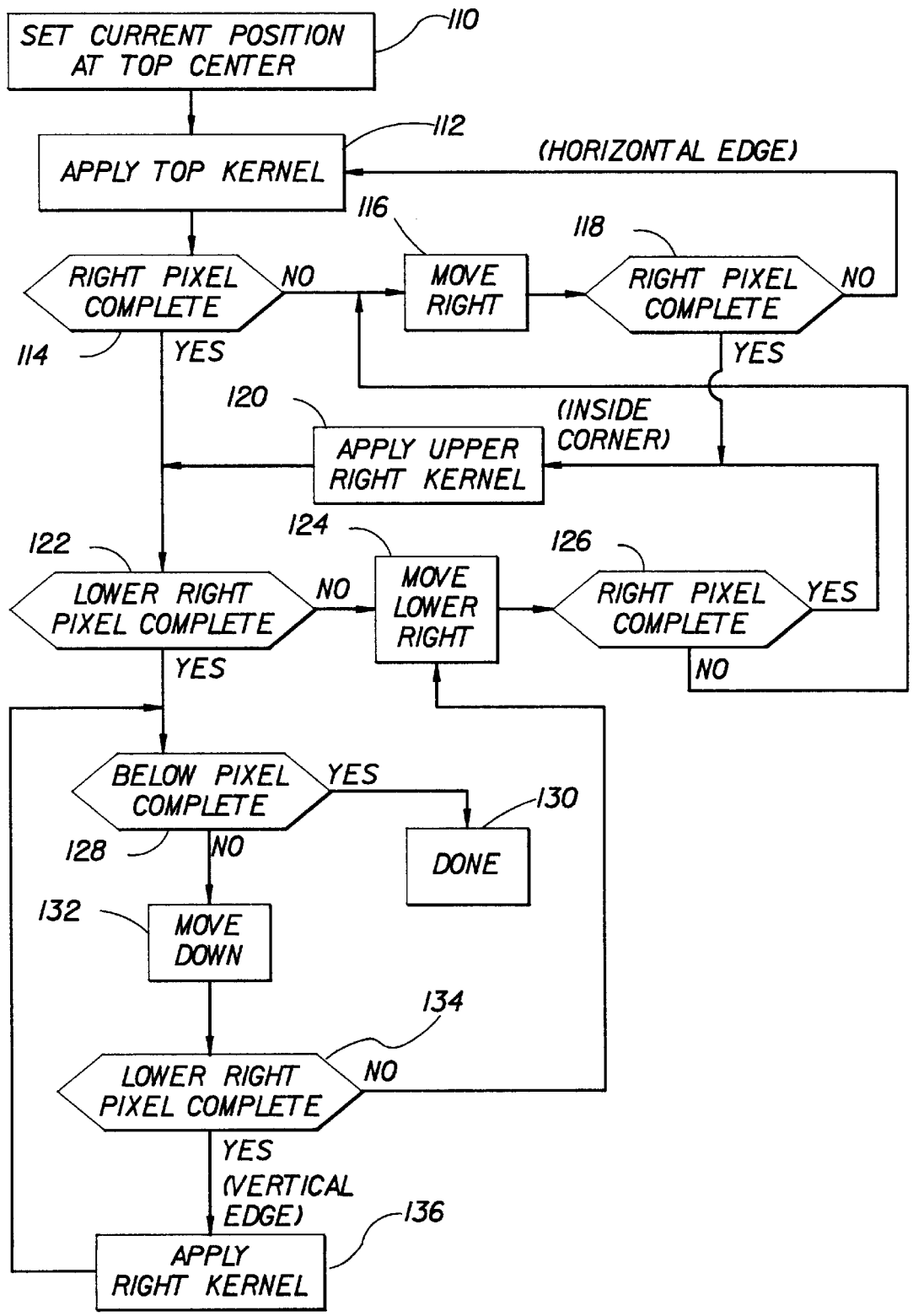
FIG. 21 depicts the procedure for selecting kernels.

Because the digitized ellipses are quadrant symmetric, the same kernels are applied at the same relative points for each quadrant. This reduces the computation required to select the appropriate kernel. (Thus each computation to select a kernel supports the calculation of four new pixel values.) To apply the appropriate kernels to the current level pixels, the following procedure of FIG. 21 can be used for a single quadrant. FIG. 19 illustrates the quadrant in which the procedure is applied. The processing starts 110 with positioning the kernel at the top center or at pixel 104 of FIG. 19. The top kernel is applied 112 and a test 114 is performed to determine whether the pixel to the right is complete, that is, has the pixel to the right already been processed. If not, the kernel is moved 116 to the right and the right pixel is again tested 118. If the right pixel is not complete then the edge is horizontal and the top kernel is again applied 112. If the right pixel is complete the upper right kernel is applied 120 because an inside corner has been detected. Next, the lower right pixel is tested 122 and if it is not complete, the pixel 124 is moved to the lower right. The system then tests 126 the right pixel attempting to identify another corner or a horizontal edge. When the lower right pixel is complete (122), the system tests 128 the pixel below and if it is complete the level processing is finished 130. If the below pixel is not complete, the kernel is moved 132 down. Next, the lower right pixel is tested 134 to look for a vertical edge. If the lower right pixel is complete a vertical edge has been detected and the right kernel is applied 136. See FIG. 20 for the results. To start the next level the kernel is moved back to the top center. Note that this procedure can be applied to the remaining quadrants by simple rotation of the pixels tested. For example, if the lower left quadrant is to be processed step 112 would apply the right kernel and step 114 would test the pixel below. Note that the actual convolution must be done individually for each pixel, since, even though the kernel is the same (although rotated) for each of the four pixels, the pixel values are not the same. FIG. 22 shows the result of applying the appropriate kernel to one entire level of the selected area of FIG. 16A.

After each level is calculated, the next level can proceed. Every pixel in a level can be calculated at the same time or in parallel as in the previous embodiment. If the pixels are processed or calculated in parallel, for each pixel a test is performed to see if all pixels corresponding to the non-zero kernel elements are complete. If so, the pixel of interest is on the current level and may be calculated. If not, the pixel must be replaced at a later date. If they are calculated sequentially, as was illustrated for the first embodiment in FIG. 2 and in FIG. 21, the pixels on the next level may be calculated if the required complete pixels exist or have been calculated. FIGS. 23 and 24 show the second and third level results of the method applied to the selected area of FIG. 16A. Note that the shape of the ellipse is converting into a rectangle which reduces the number of kernels which are used finally reducing to just top, bottom and side kernels.

At some stages, especially the final ones, more than one kernel will be valid for the convolution. When this occurs, either an arbitrary choice between kernels may be made or the average result of all of the valid kernels may be used as in the previous embodiment. This will also happen if a single pixel, row of pixels, or column of pixels remain. For example, if a horizontal row of unknown pixels remains, both the top and bottom kernels can be used and the results of the kernel convolutions may be averaged. FIG. 25 shows the final result of the method as applied to the selected area of FIG. 16A. To improve the clarity of the example, averaging is not done and the corner kernels are chosen in preference to the side kernels. The upper right kernel is attempted first.

All of the convolutions described above with respect to the second embodiment are also very computationally efficient on binary, digital computers. Once again no multiply or divide operations need to be done, only shifts and adds. Finding out which kernel to apply does require more work, as well as tracking which pixels need to be calculated. This can readily be done by maintaining a template of the region of interest which contains values indicating the status of each pixel. Additional work is necessary to support averaging. All of which is within the skill of the art. The elliptical approach does require more overhead than the rectangular approach, but the visual results are superior.

The iterative use of the kernels of FIGS. 17 and 18 in the manner described above effectively obscures image information without creating objectionable artifacts. Using an elliptical region of interest and associated appropriately shaped kernels, while requiring slightly more work computationally than using rectangular regions of interest, provides superior results. The elliptical approach maintains all other advantages of the rectangular region of interest approach.

This invention provides an automatic method for the efficient obscuration of image information without creating image artifacts that are readily perceptible to the viewer. The procedure does not require any user interaction once the region to be obscured is defined. The resulting image information lacks the objectionable image detail, but incorporates image structure from within and without the obscured area. The obscuration at the edge of the region is very small, while the effective level of obscuration is larger within the interior. Thus, the area is effectively obscured but does not create objectionable discontinuities within the image. The approach is very computationally efficient, requiring only additions and arithmetic shift operations. The use of an elliptical region of interest provides superior results to an approach using rectangular regions of interest while maintaining all of its advantages with only a slight increase in computational cost. The elliptical region of interest approach described herein is superior in that the borders created are not linear (either vertically or horizontally) and thus are less perceptible to the human visual system. The elliptical approach is also superior in that the regions described tend to be more natural and less artificial. The elliptical approach is also superior in that there is a reduced tendency to create diagonal artifacts within the obscured area.

The shape of the region used for processing can be arbitrary as long as it is a closed curve and the kernels of FIGS. 17 and 18 modified according to curve sharpness can be used to process the region. Thus, it is possible for the user to outline the area to be obscured using conventional drawing techniques and have only that limited region obscured.

The present invention has been described with respect to a particular process step order of sequentially marching around the region of interest using appropriate kernels, detecting when all pixels of a level have been processed and moving in a level until all pixels have been processed. It is of course possible that other approaches can be taken, such as processing in parallel all at once by testing non-zero kernel element pixels for completeness.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

| Parts List |
| --- |
| 10 Camera |
| 12 Image |
| 14 Computer |
| 16 Display |
| 18 Operator |
| 20 Input Device |
| 22 Region |
| 24 Obscuration Process |
| 26 Printer |
| 40–64 Process Steps |
| 80 Image |
| 82 Ball |
| 83 Hand |
| 84 Arm |
| 86 Person |
| 88 Region |
| 90 Pixel |
| 100 Image |
| 102 Region |
| 104 Pixel |
| 110–136 Process Steps |

What is claimed is:

1. A method of obscuring information in an image, comprising:
   (a) obtaining one digital representative of the image;
   (b) completely enclosing a region of the image having a plurality of pixels for obscuration so that the lines delineate the enclosed region;
   (c) merging first image signal information that is from outside the region and that is also in the digital representation with second image signal information that is from inside the region and that is also in the digital representation by applying at least two convolution kernels around the perimeter of the region toward the center in discrete sequential concentric smaller layers, the result of each layer being merged with the next layer; and, (d) obscuring the bounded region as a result of step (c).

2. A system, comprising:

an image source device providing one digital representative of an image;

an input/output device allowing a user to completely enclose a region of the image having a plurality of pixels for obscuration so that the lines delineate the enclosed region; and a computer, coupled to said source device and said input/output device, processing the region of the image to obscure information in the region by merging signal information that is outside the region and that is also in the digital representation with signal information that is inside the region and that is also in the digital representation by applying at least two different convolution kernels around the perimeter of the region toward the center in discrete sequential concentric smaller layers, the result of each layer being merged with the next layer.

3. A method as recited in claim 1, wherein the region has a shape and the at least two convolution kernels has a shape corresponding to the shape of the region.

4. A method as recited in claim 1, wherein the at least two convolution kernels comprise an element for an image pixel of interest and elements closer to an outside edge of the region than the pixel of interest.

5. A method as recited in claim 4, wherein the at least two convolution kernels include elements that are a power of two.

6. A method as recited in claim 1, wherein the at least two convolution kernels comprise a first kernel for flat region areas and a second kernel for curved region areas.

7. A method as recited in claim 1, wherein the at least two convolution kernels are symmetric.

8. A method as recited in claim 7, wherein the at least two convolution kernels convolve a pixel of interest and exterior neighboring pixels.

9. A method as recited in claim 8, wherein the at least two convolution kernels convolve exterior neighbor pixels of an adjacent different layer.

10. A method as recited in claim 7, wherein the at least two convolution kernels are rotationally symmetric about a normal to a surface of the region.

11. A method as recited in claim 10, wherein the at least two convolution kernels provide the same response when symmetrically rotated when presented with identical data.

12. A method as recited in claim 9, wherein a weighting of the pixel of interest is $1/16$th.

13. A method as recited in claim 9, wherein a weighting of the exterior immediate neighbor pixels is $4/16$ths and a weighting of the exterior neighbors is $1/16$th.

14. A method as recited in claim 1, wherein the at least two convolution kernels include a number of elements that are a power of two.

15. A method as recited in claim 1, wherein step (b) includes only addition and shift operations.

16. A method as recited in claim 1, wherein step (b) convolves information exterior to the region toward a central point of the region.

17. A method as recited in claim 1, wherein the region is a closed curve shaped to approximate an expected shape of a region of undesirable features.

18. A method as recited in claim 1, further comprising (c) printing the image.

19. A system as recited in claim 2, further comprising a printer printing the image including the obscured region.

20. A system according to claim 2 wherein the image source device is a camera or an image storage device.

* * * * *